(12) United States Patent
Vroom et al.

(10) Patent No.: US 12,489,816 B2
(45) Date of Patent: Dec. 2, 2025

(54) SYSTEM AND METHOD FOR REMOTELY CONTROLLING CLOUD-BASED CLIENT APPLICATIONS

(71) Applicant: Skillz Platform Inc., Las Vegas, NV (US)

(72) Inventors: Matthew Leigh Vroom, San Francisco, CA (US); Meidad Glory, San Francisco, CA (US); Vatsal Bhardwaj, San Francisco, CA (US)

(73) Assignee: SKILLZ PLATFORM INC., Las Vegas, NV (US)

( * ) Notice: Subject to any disclaimer, the term of this patent is extended or adjusted under 35 U.S.C. 154(b) by 143 days.

(21) Appl. No.: 18/491,134

(22) Filed: Oct. 20, 2023

(65) Prior Publication Data

US 2024/0137425 A1    Apr. 25, 2024
US 2024/0236204 A9    Jul. 11, 2024

Related U.S. Application Data

(60) Provisional application No. 63/380,327, filed on Oct. 20, 2022.

(51) Int. Cl.
     *H04L 67/131*    (2022.01)
     *H04L 65/10*    (2022.01)
     (Continued)

(52) U.S. Cl.
     CPC ........ *H04L 67/131* (2022.05); *H04L 65/1013* (2013.01); *H04L 65/1059* (2013.01); *H04L 65/1069* (2013.01)

(58) Field of Classification Search
     CPC ............. H04L 65/1013; H04L 65/1059; H04L 65/1069; H04L 67/131
See application file for complete search history.

(56) References Cited

U.S. PATENT DOCUMENTS 10,576,380 B1 *   3/2020   Beltran ................... A63F 13/67
10,773,156 B2 *   9/2020   Colenbrander ........ H04N 21/63
(Continued)

FOREIGN PATENT DOCUMENTS

WO      2024086815 A1      4/2024

*Primary Examiner* — Boris D Grijalva Lobos
(74) *Attorney, Agent, or Firm* — Mintz, Levin, Cohn, Ferris, Glovsky and Popeo, P.C.

(57) ABSTRACT

Methods, systems, and apparatus, including computer programs encoded on a computer storage medium, for remotely controlling cloud-based client applications. The method can include: receiving a first request from a client device of a first user to initiate an interactive session with a cloud-based client application and a second request from a cloud-connected client application controller of the first user to connect to the interactive session, wherein the cloud-based client application is configured to execute on a computing platform different from the client device and the cloud-connected application controller, and wherein the cloud-connected application controller is separate from and in communication with the client device; reserving, in response to the first request, an application engine from a pre-instantiated application engine pool of a plurality of pre-instantiated application engine pools within which the cloud-based client application executes remotely from the client device and the cloud-connected application controller; connecting, in response to the second request, to the cloud-connected client application controller separately from the client device; receiving interaction data as the first user engages with first media data associated with the cloud-based client application via the cloud-connected client application controller as the first media data is displayed to the first user via a display application executing on the client device; modifying the cloud-based client application executing within the application engine based on the received interaction data; and providing second media data associated (Continued)

with the modified cloud-based client application to the first user via the display application executing on the client device for interaction via the cloud-connected application controller.

19 Claims, 5 Drawing Sheets

(51) Int. Cl.
*H04L 65/1059* (2022.01)
*H04L 65/1069* (2022.01)

(56) References Cited

U.S. PATENT DOCUMENTS

| | | |
|---|---|---|
| 11,445,248 B1 | 9/2022 | Leigh et al. |
| 2014/0342819 A1 | 11/2014 | Bruno et al. |
| 2017/0072307 A1* | 3/2017 | Perry ................... A63F 13/77 |
| 2017/0142201 A1* | 5/2017 | Holmes ................ A63F 13/355 |
| 2022/0413935 A1* | 12/2022 | Kantamneni ......... G06F 9/5077 |
| 2023/0405454 A1* | 12/2023 | Phillips ................ A63F 13/352 |
| 2024/0131425 A1* | 4/2024 | Colenbrander ......... A63F 13/77 |

* cited by examiner

SYSTEM AND METHOD FOR REMOTELY CONTROLLING CLOUD-BASED CLIENT APPLICATIONS

CROSS-REFERENCE TO RELATED APPLICATIONS

This application claims the benefit of U.S. Provisional Application No. 63/380,327, filed Oct. 20, 2022, the entire contents of which are hereby incorporated by reference herein.

BACKGROUND

Interacting with cloud-based client applications can present both opportunities and challenges for users. While running remote instances of a client application can relieve platform restrictions and separate hardware requirements from client application performance, a limiting factor can be connection latency. The user experience can be dependent on the quality of connection to the service and the amount of time it takes for a user's inputs to be transmitted to the servers, processed, and sent back to the user. Such a limitation can be particularly problematic in cloud-based gaming. In local gaming, one of the key metrics with which players are concerned is controller lag—how long it takes for their device to process a signal from their controller input and for the game to register the input. Typically, players prefer sub-20 millisecond response times. However, when combined with cloud-based gaming, controller latencies can compound—going from controller to device for processing, the signal is then relayed to the cloud gaming service as input and sent back to the user.

SUMMARY

The present invention is directed to a system and method for remotely controlling cloud-based client applications. According to the present invention, a client application can be emulated remotely on a cloud-based client application platform. The video and audio from the cloud-based client application can be streamed in real-time to a browser or application running on the client device of a user. Inputs from the user can be transmitted back to the client application engine to allow the user to control and interact with the cloud-based client application in real-time. A cloud-connected client application controller can be connected to the cloud-based client application platform, rather than to the user's device, to substantially reduce the signal latency.

In an aspect, a method comprises receiving, by at least one data processor, a first request from a client device of a first user to initiate an interactive session with a cloud-based client application and a second request from a cloud-connected client application controller of the first user to connect to the interactive session, wherein the cloud-based client application is configured to execute on a computing platform different from the client device and the cloud-connected application controller, and wherein the cloud-connected application controller is separate from and in communication with the client device. The method also comprises reserving, by the at least one data processor and in response to the first request, an application engine from a pre-instantiated application engine pool of a plurality of pre-instantiated application engine pools within which the cloud-based client application executes remotely from the client device and the cloud-connected application controller. The method also comprises connecting, by the at least one data processor and in response to the second request, to the cloud-connected client application controller separately from the client device. The method also comprises receiving, by the at least one data processor, interaction data as the first user engages with first media data associated with the cloud-based client application via the cloud-connected client application controller as the first media data is displayed to the first user via a display application executing on the client device. The method also comprises modifying, by the at least one data processor, the cloud-based client application executing within the application engine based on the received interaction data. The method also comprises providing, by the at least one data processor, second media data associated with the modified cloud-based client application to the first user via the display application executing on the client device for interaction via the cloud-connected application controller.

For example, the method can further comprise, prior to receiving the first request, maintaining the application engine in a standby or sleep mode.

For example, the method can further comprise, subsequent to reserving the application engine from the pre-instantiated application engine pool, replacing the application engine with a second application engine.

For example, the pre-instantiated application engine pool has a fixed size.

For example, the pre-instantiated application engine pool has a dynamically changing size.

For example, the size changes based at least in part on usage trends or historical usage information.

For example, the size increases as usage trends increase for an application engine module of the pre-instantiated application engine pool and the size decreases as usage trends decrease for the application engine module.

For example, changing the size of the pre-instantiated application engine pool comprises: training a machine learning model based on usage trend data for an application engine module to modify the size of the pre-instantiated application engine pool to minimize an amount of time to allocate an application module and maintain a reduced allocation time for allocation of an application module; using the trained machine learning model to modify the size of the pre-instantiated application engine pool.

For example, at least a first subset of pre-instantiated application engine pools of the plurality of pre-instantiated application engine pools comprise fixed-size pre-instantiated application engine pools and at least a second subset of pre-instantiated application engine pools of the plurality of pre-instantiated application engine pools comprise dynamically-sized pre-instantiated application engine pools.

For example, the first subset comprises pre-instantiated application engine pools that have lower usage than the pre-instantiated application engine pools of the second subset.

In an aspect, a system comprises at least one data processor. The system also comprises memory storing instructions that, when executed by the at least one data processor, cause the at least one data processor to perform a set of operations. The operations comprise receiving a first request from a client device of a first user to initiate an interactive session with a cloud-based client application and a second request from a cloud-connected client application controller of the first user to connect to the interactive session, wherein the cloud-based client application is configured to execute on a computing platform different from the client device and the cloud-connected application controller, and wherein the cloud-connected application controller is separate from and in communication with the client device. The operations also comprise reserving, in response to the first request, an application engine from a pre-instantiated application engine pool of a plurality of pre-instantiated application engine pools within which the cloud-based client application executes remotely from the client device and the cloud-connected application controller. The operations also comprise connecting, in response to the second request, to the cloud-connected client application controller separately from the client device. The operations also comprise receiving interaction data as the first user engages with first media data associated with the cloud-based client application via the cloud-connected client application controller as the first media data is displayed to the first user via a display application executing on the client device. The operations also comprise modifying the cloud-based client application executing within the application engine based on the received interaction data. The operations also comprise providing second media data associated with the modified cloud-based client application to the first user via the display application executing on the client device for interaction via the cloud-connected application controller.

For example, the operations can further comprise, prior to receiving the first request, maintaining the application engine in a standby or sleep mode.

For example, the operations can further comprise, subsequent to reserving the application engine from the pre-instantiated application engine pool, replacing the application engine with a second application engine.

For example, the pre-instantiated application engine pool has a fixed size.

For example, the pre-instantiated application engine pool has a dynamically changing size.

For example, the size changes based at least in part on usage trends or historical usage information.

For example, the size increases as usage trends increase for an application engine module of the pre-instantiated application engine pool and the size decreases as usage trends decrease for the application engine module.

For example, changing the size of the pre-instantiated application engine pool comprises: training a machine learning model based on usage trend data for an application engine module to modify the size of the pre-instantiated application engine pool to minimize an amount of time to allocate an application module and maintain a reduced allocation time for allocation of an application module; using the trained machine learning model to modify the size of the pre-instantiated application engine pool.

For example, at least a first subset of pre-instantiated application engine pools of the plurality of pre-instantiated application engine pools comprise fixed-size pre-instantiated application engine pools and at least a second subset of pre-instantiated application engine pools of the plurality of pre-instantiated application engine pools comprise dynamically-sized pre-instantiated application engine pools.

For example, the first subset comprises pre-instantiated application engine pools that have lower usage than the pre-instantiated application engine pools of the second subset.

In an aspect, a computer program product comprises a non-transitory machine readable medium storing instructions that, when executed by at least one programmable processor forming part of at least one computing system, cause the at least one programmable processor to perform a set of operations. The operations comprise receiving a first request from a client device of a first user to initiate an interactive session with a cloud-based client application and a second request from a cloud-connected client application controller of the first user to connect to the interactive session, wherein the cloud-based client application is configured to execute on a computing platform different from the client device and the cloud-connected application controller, and wherein the cloud-connected application controller is separate from and in communication with the client device. The operations also comprise reserving, in response to the first request, an application engine from a pre-instantiated application engine pool of a plurality of pre-instantiated application engine pools within which the cloud-based client application executes remotely from the client device and the cloud-connected application controller. The operations also comprise connecting, in response to the second request, to the cloud-connected client application controller separately from the client device. The operations also comprise receiving interaction data as the first user engages with first media data associated with the cloud-based client application via the cloud-connected client application controller as the first media data is displayed to the first user via a display application executing on the client device. The operations also comprise modifying the cloud-based client application executing within the application engine based on the received interaction data. The operations also comprise providing second media data associated with the modified cloud-based client application to the first user via the display application executing on the client device for interaction via the cloud-connected application controller.

BRIEF DESCRIPTION OF THE DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION OF THE INVENTION

Figure 1:
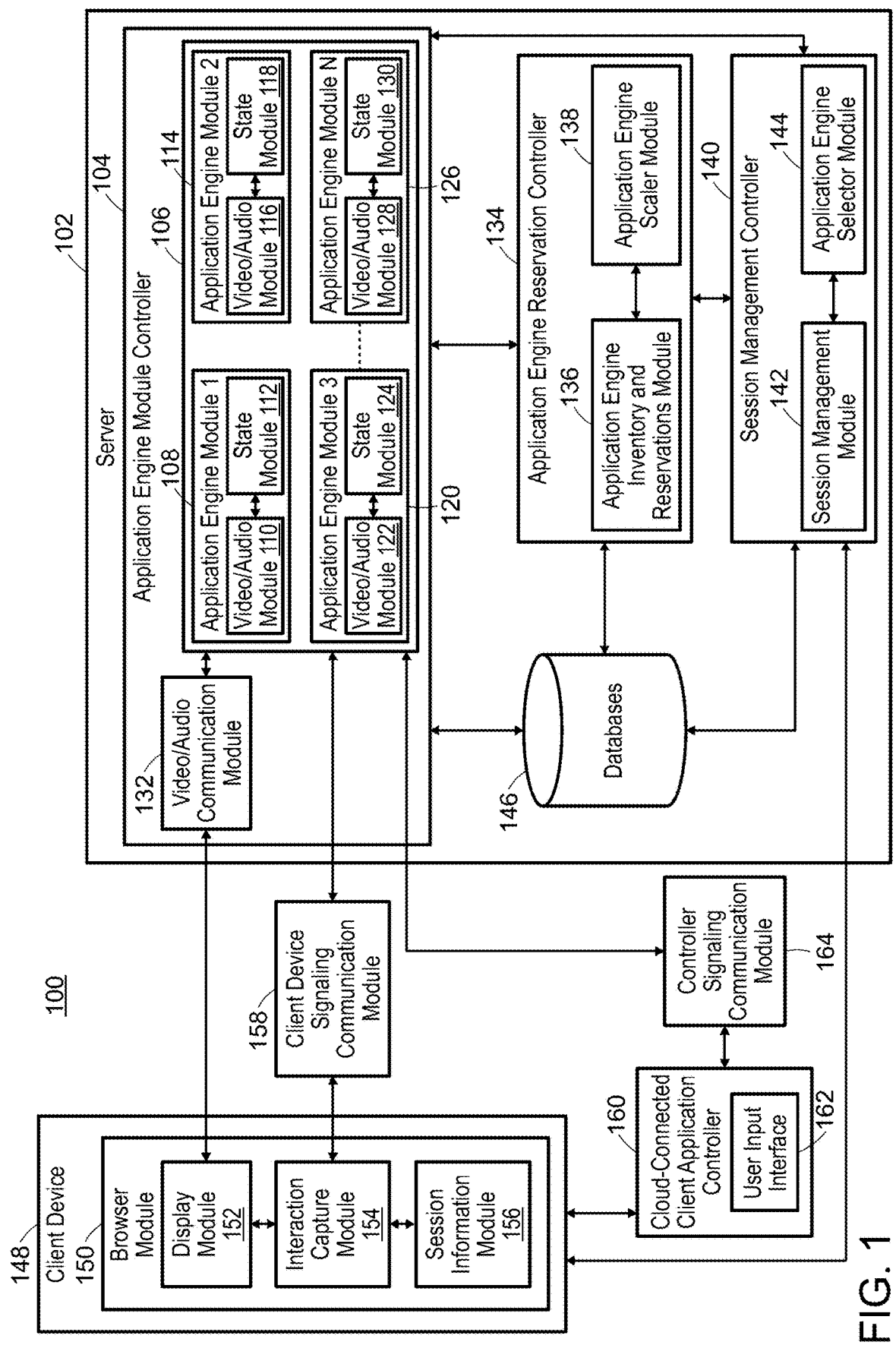
FIG. 1 is a block diagram illustrating an example cloud-based client application platform for remotely controlling cloud-based client applications.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The present invention is directed to a system and method for remotely controlling cloud-based client applications. According to the present invention, a client application can be rendered remotely on an emulated client device on a cloud-based client application platform. The video and audio from the cloud-based client application can be streamed in real-time to a browser or other application running on the client device of a user. The user can interact with the cloud-based client application through the local browser or application as if the client application was running natively on the client device. Inputs from the user can be transmitted back to the remote emulated device to allow the user to control and interact with the cloud-based client application in real-time. The present invention can support remote interaction with any suitable type of cloud-based client application for any type of client device (e.g., smartphones, tablets, laptops, desktop computers, gaming consoles, and the like) running any type of operating system and independent of the underlying hardware and device characteristics of the client device. Cloud-based client applications can include, for example, mobile games or any other suitable type of client application designed to operate on a client device, but which are capable of being rendered remotely and controlled remotely on a client device according to embodiments of the present invention. In some implementations of the present invention, a cloud-connected client application controller, such as, for example, a mobile gaming controller or the like, can be in remote communication with or otherwise remotely connected to the cloud-based client application platform, rather than to the user's device, to substantially reduce the signal latency. The cloud-connected client application controller can include suitable electronics, such as, for example, a Wi-Fi chip and a microprocessor or the like, capable of initiating and managing a remote (e.g., wireless) connection with the cloud-based client application platform. In an embodiment, users on-the-go can opt to connect their cloud-connected client application controller over a wireless hotspot or the like. In addition to a cloud connection, the cloud-connected client application controller can provide a local connection mode to either interface with a client device interacting with a cloud-based client application or with an application running on the client device itself. Such a mode can be user selectable or automatic, depending on the preference. For example, external factors, such as, for example, the presence of a Wi-Fi connection within range of the client device or a host Bluetooth device, could be used to determine the connection mode of the cloud-connected client application controller in a way that is fully transparent to the user.

Embodiments of the present invention can support content distribution across different platforms. For example, for touchscreen gaming on mobile devices whose platforms are locked down, some implementations of the present invention can circumvent mobile application store policies that prohibit certain styles of game delivery by instead relying on the browser of the client device. Embodiments of the present invention can also be used to address issues with client application controller compatibility that can arise when trying to interface with a client application running in the cloud via a mobile browser. Some mobile operating systems can prevent paired controllers from interacting with content in the mobile browser. In some implementations of the present invention, the cloud-connected client application controller can alleviate such hardware blocks by interfacing directly to the cloud-based client application platform. Some implementations of the present invention can overcome the remote connection challenges with client application controllers that have no display or keyboard. For example, through the use of Internet of Things (IoT) and home automation techniques, various pairing methods can be used that are not dependent on having a display. For instance, once the cloud-connected client application controller gains access to an internet-enabled Wi-Fi or other remote connection access point, various methods can be used for connecting to the cloud-based client application platform. Merely for purposes of discussion and not limitation, the present disclosure can refer to cloud-based mobile games as an exemplary cloud-based client application to illustrate various aspects of the present invention. However, the present invention can be used in and with any suitable type of client application that is capable of being rendered remotely on and operated remotely from a client device.

FIG. 1 is a block diagram illustrating an example cloud-based client application platform 100 for remotely controlling cloud-based client applications, in accordance with embodiments of the disclosure. The cloud-based client application platform 100 can include a server system 102. The server can be cloud-based (e.g., Amazon Web Services, Google Cloud, Microsoft Azure, or other suitable cloud-based infrastructure provider) or be comprised of dedicated server hardware. The server system 102 can include an application engine module controller 104. The application engine module controller 104 can include a plurality of application engine modules 106 to support any appropriate type of cloud-based client application. In embodiments, each application engine module of the plurality of application engine modules 106 can be configured to emulate a particular type and configuration of client device for executing a cloud-based client application. For example, in some implementations of the present invention, each or any of the application engine modules can comprise a suitable client device emulator. Each cloud-based client application can execute within a respective application engine module in the plurality of application engine modules 106 as if the client application was executing natively on the given client device. The application engine module controller 104 can allow registration/deregistration of application engine modules, atomic reservation of application engine modules, querying of application engine modules, and the like. The plurality of application engine modules 106 can include a first application engine module 108, a second application engine module 114, a third application engine module 120, . . . , and a Nth application engine module 126, where N can be any suitable natural number and can vary over time, as discussed below. Each application engine module 108, 114, 120, . . . 126 can include a video/audio module for managing video and/or audio media data generated by the cloud-based client application executing in the respective application engine module and transmitting or otherwise streaming such video and/or audio media data to a client device for display to a user. Each application engine module 108, 114, 120, . . . 126 can also include a state module for receiving and processing input (e.g., mapping input to the video/audio stream, etc.) from the client device generated while the user (remotely) interacts with the cloud-based client application. Each state module can also maintain the state of the cloud-based client application executing in the respective application engine module 108, 114, 120, . . . 126. For example, the first application engine module 108 can include a first video/audio module 110 in communication with a first state module 112. The second application engine module 114 can include a second video/audio module 116 in communication with a second state module 118. The third application engine module 120 can include a third video/audio module 122 in communication with a third state module 124. The Nth application engine module 126 can include a Nth video/audio module 128 in communication with a Nth state module 130. The application engine module controller 104 can maintain any suitable number of application engine modules and register (i.e., instantiate, allocate, or otherwise create) or deregister (i.e., delete or deallocate) application engine modules as necessary. In an embodiment, the server system 102 can include a plurality of application engine module controllers 104, with each application engine module controller 104 managing respective pluralities of application engine modules 106 to form one or more application engine module clusters.

In some implementations of the present invention, each application engine module 108, 114, 120, . . . 126 can run as an essential container in a ReplicaSet in Kubernetes or the like with, for example, a webRTC bridge (a media channel for video/audio media data), OpenGL, or other suitable technology to support real-time media communication capabilities with browsers or other appropriate applications running on the client devices. A ReplicaSet is a process that can run multiple instances of an application engine module and keep the specified number of application engine modules constant. The ReplicaSet can maintain the specified number of application engine module instances running in or with the application engine module controller 104 at any given time to prevent users from losing access to their cloud-based client application when an application engine module fails or is inaccessible. In an embodiment, each application engine module 108, 114, 120, . . . 126 can also include an envoy proxy (as either or both an egress proxy or an ingress proxy) that can handle health checks and the like and, for example, CORS (Cross-Origin Resource Sharing) requests or other like requests. Additionally or alternatively, each application engine module 108, 114, 120, . . . 126 can include a debug bridge for receiving and processing debug and other application engine module commands (e.g., from the application engine reservation controller 134 discussed below).

In an embodiment, the application engine module controller 104 can include a video/audio communication module 132 to support media communication between an application engine module of the plurality of application engine modules 106 and the client device. In an alternative embodiment, the video/audio communication module 132 can reside within the server system 102 but outside of and in communication with the application engine module controller 104. Additionally or alternatively, each or any application engine module of the plurality of application engine modules 106 can include or be in communication with a respective video/audio communication module 132. In other words, each or any of a plurality of video/audio communication modules 132 can reside in or be associated with each or any of the application engine modules of the plurality of application engine modules 106. In some implementations of the present invention, the video/audio communication module 132 can comprise a TURN (Traversal Using Relay NAT) server or the like (e.g., a STUN (Session Traversal Utilities for NAT) server, etc.) to support communication of video/audio media data between an application engine module and the client device. Additionally or alternatively, the video/audio communication module 132 can comprise a suitable encoder to encode video to, for example, h.264 or VP8 for WebRTC or the like. However, other suitable server communication protocols, encoding techniques, and/or transmission protocols for video/audio media data are possible.

The server system 102 can include an application engine reservation controller 134 in communication with the application engine module controller 104. In embodiments, the application engine reservation controller 134 can control various aspects of the plurality of application engine modules 106, including, for example, orchestrating application engine module scaling, controlling application engine module access, managing application engine module initialization for users, and the like. The application engine reservation controller 134 can include an application engine inventory and reservations module 136. The application engine inventory and reservations module 136 can track and manage the inventory of all application engine modules in the plurality of application engine modules 106. The application engine inventory and reservations module 136 can also grant application engine module reservations for use in active sessions. In some implementations of the present invention, when a user requests initiation of an active session with a cloud-based client application, the application engine inventory and reservations module 136 can reserve an appropriate application engine module, load or cause to load the reserved application engine module with the requested cloud-based client application (if not already loaded or pre-loaded), populate or cause to populate the loaded cloud-based client application with the appropriate user and/or application data (e.g., user profile information, user account information, application state information, etc. to support user interaction and engagement with the cloud-based client application), and bind or otherwise link the reserved application engine module to that active session. If no application engine module is available for the active session, the application engine inventory and reservations module 136 can instruct the application engine module controller 104 (e.g., via the application engine scaler module 138, discussed below) to add and register a new application engine module for the requested action session.

In some implementations of the present invention, the registration process can be performed asynchronously. For example, the application engine inventory and reservations module 136 can wait for the new application engine module to be added and reserved by polling the application engine module controller 104 periodically or receiving an appropriate message from the application engine module controller 104 once the task has been completed. Once the application engine module is registered, it can be reserved for and bound to the active session. In some implementations of the present invention, the application engine module that has been reserved for the active session can be accessible only to the user that requested it, and only for the lifespan of the active session. In other words, an application engine module that has been reserved for a particular active session may not be used or accessed by another user during that active session. In some implementations of the present invention, the data stored in or otherwise used by the reserved application engine module during the active session can be ephemeral. For example, the application engine module can be deregistered at the end of an active session. Accordingly, any and all data stored or otherwise used by the application engine module during that active session can be deleted, for example, no later than the deregistration of the application engine module. In an alternative embodiment, the data stored in or otherwise used by the reserved application engine module during the active session can be stored (e.g., in databases 146), retrieved, and used in and with a subsequent active session by the user. Once the application engine module has been deregistered, it can be reused for another active session or its computing resources can be reallocated to a different application engine module.

In embodiments, the application engine reservation controller 134 can include an application engine scaler module 138 in communication with the application engine inventory and reservations module 136. The application engine scaler module 138 can respond to inventory and reservation changes by adding and instantiating new application engine modules to the plurality of application engine modules 106. The application engine scaler module 138 can proactively scale the number of application engine modules in the plurality of application engine modules 106 based on, for example, usage trends or other suitable metrics to maintain a sufficiently-sized pool of reservable application engine modules. For example, the application engine scaler module 138 can store a predetermined threshold (e.g., provided or generated based on usage trends or other appropriate metrics) for the size of the pool of the plurality of application engine modules 106. If the number of reservable application engine modules decreases below the predetermined threshold, the application engine scaler module 138 can add new application engine modules to the plurality of application engine modules 106 to increase the number of reservable application engine modules above the predetermined threshold. If the increase in the number of reservable application engine modules becomes too great (e.g., above a second predetermined threshold), the application engine scaler module 138 can either do nothing or can delete or otherwise deallocate unneeded extra application engine modules from the plurality of application engine modules 106. Additionally or alternatively, suitable machine learning/artificial intelligence techniques can be used by the application engine scaler module 138 to appropriately and dynamically scale the number of reservable application engine modules in the plurality of application engine modules 106. For example, a machine learning model can be trained based on usage data from users (e.g., usage trends, peak usage, off-hour usage, etc.). The machine learning model can then be used to dynamically add and delete/deallocate application engine modules in the plurality of application engine modules 106. The machine learning model can be updated or otherwise adapted as the usage data evolves over time. In some implementations of the present invention, the plurality of application engine modules 106 can be associated with or otherwise correspond to and be in communication with one or more application engine module pools, which can be managed by, for example, the application engine inventory and reservations module 136 and/or the application engine scaler module 138. For example, the application engine modules for each or any emulated client device supported by the cloud-based client application platform 100 can be maintained in a single, large application engine module pool. Application engine modules for active sessions requested by users can be allocated, reserved, and instantiated from such a single application engine module pool by, for example, the application engine inventory and reservations module 136 and/or the application engine scaler module 138. However, accessing and instantiating each application engine module from such a single, large application engine module pool can create potential bottlenecks. For example, it can take a substantial amount of time and computing resources to spin-up each application engine module separately, particularly when there could be tens of thousands, hundreds of thousands, or even millions of users for which corresponding application engine modules are being instantiated for the cloud-based client application platform 100 at any given time. The resulting allocation delays could adversely affect performance of and user interaction with the cloud-based client application platform 100, which could result in user dissatisfaction and even user churn.

Figure 2:
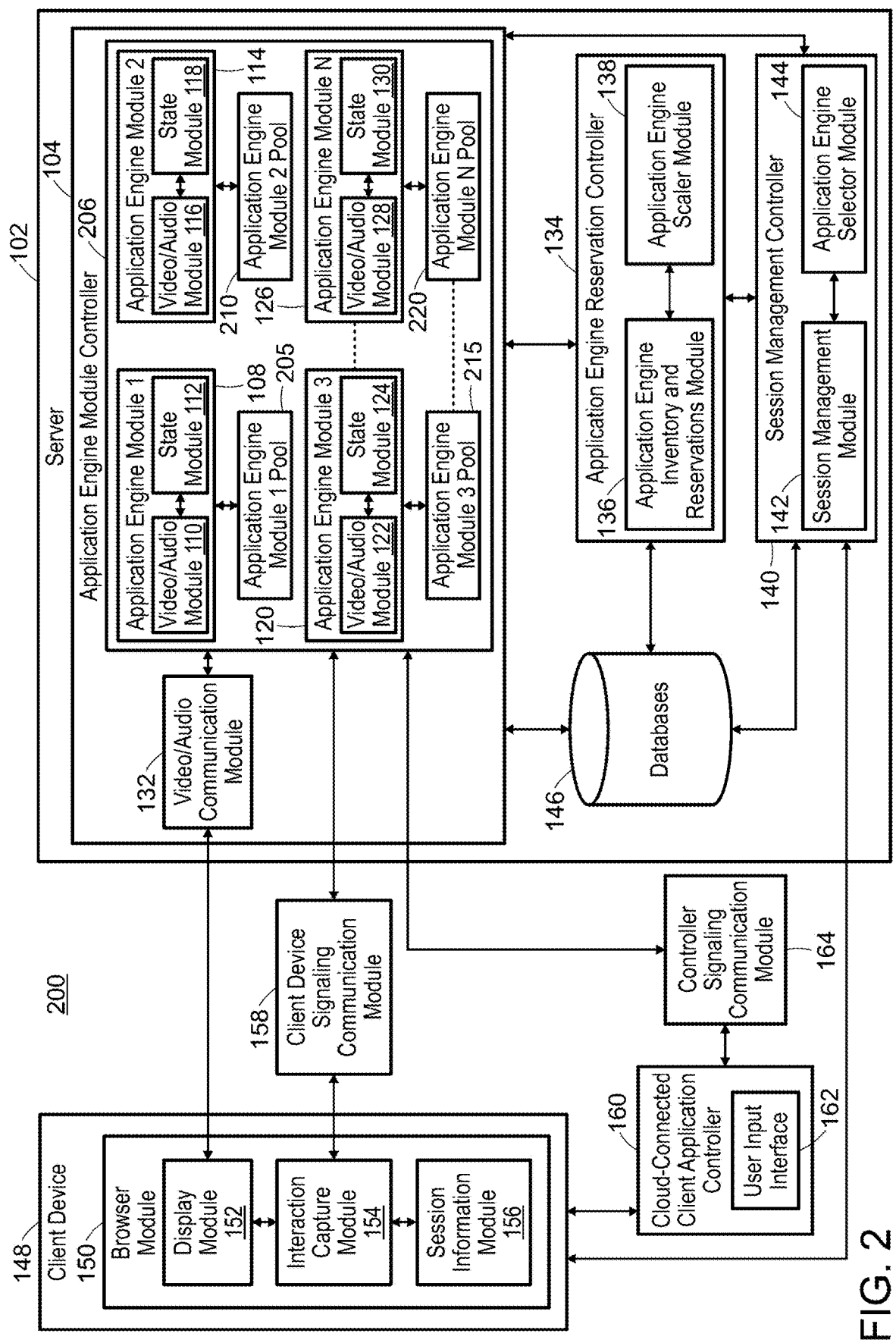
FIG. 2 is a block diagram illustrating an example cloud-based client application platform with a plurality of application engine module pools for remotely controlling cloud-based client applications.

FIG. 2 is a block diagram illustrating an example cloud-based client application platform 200 with a plurality of application engine module pools for remotely controlling cloud-based client applications, in accordance with embodiments of the disclosure. In some implementations of the present invention, each or any of a plurality of application engine modules 206 can be associated and in communication with a separate application engine module pool that can be maintained by, for example, the application engine inventory and reservations module 136 and/or the application engine scaler module 138, with each application engine module pool supporting an individual type of application engine module or a set of related types of application engine modules. The plurality of application engine modules 206 can operate in a manner similar to that discussed and described with respect to the plurality of application engine modules 106 in FIG. 1. In the embodiment illustrated in FIG. 2, each cloud-based client application can have or be associated with its own individual application engine module pool. For example, each pool of the plurality of application engine module pools can be configured to support a single cloud-based client application, such that each pool of the plurality of application engine module pools can be allocated on a per cloud-based client application basis. For purposes of illustration and not limitation, a klondike solitaire mobile game designed to run on an Android smartphone can be supported by the first application engine module 108, which can be associated with a first application engine module pool 205 of first application engine modules. A klondike solitaire PC game designed to run on a PC laptop can be supported by the second application engine module 114, which can be associated with a second application engine module pool 210 of second application engine modules. A klondike solitaire mobile game designed to run on an iOS smartphone can be supported by the third application engine module 120, which can be associated with a third application engine module pool 215 of third application engine modules. A klondike solitaire game designed to run on a game console can be supported by the Nth application engine module 126, which can be associated with an Nth application engine module pool 220 of Nth application engine modules, and so forth. Alternatively, each pool of the plurality of application engine module pools can be configured to support a set of related application engine modules (e.g., application engine modules that emulate Android smartphones, such as with a particular operating system version), such that each pool of the plurality of application engine module pools can be allocated on a per application engine module-type basis. Any suitable number of application engine module pools can be maintained and supported for any appropriate number of application engine modules by, for example, the application engine inventory and reservations module 136 and/or the application engine scaler module 138, depending on, for instance, the number of cloud-based client applications (or, alternatively, application engine module types) supported by the system or any appropriate subset thereof.

In some implementations of the present invention, each or any of the application engine modules in each pool of the plurality of application engine module pools can be "pre-warmed." For example, the application engine modules in each pool of the plurality of application engine module pools can be pre-allocated and pre-instantiated within the application engine module pool and then put into standby or sleep mode by, for instance, the application engine inventory and reservations module 136 and/or the application engine scaler module 138. By spinning up the application engine modules in each application engine module pool in the background and maintaining those spun-up application engine modules in a standby mode, an application engine module can be immediately (or nearly immediately) reserved and assigned to a user upon request of an active session with little or no concomitant delay, since awakening an application engine module that is in standby mode can take substantially less time than instantiating the application engine module from scratch. Once an application engine module in an application engine module pool is reserved and assigned, the reserved and assigned application engine module can be immediately (or nearly immediately) replaced by another "pre-warmed" application engine module from the corresponding application engine module pool so that it can be ready for immediate (or nearly immediate) reservation by and assignment to the next user requesting an active session. Such a "pre-warmed" replacement process can continue as each application engine module in an application engine module pool is reserved and assigned. In such a manner, application engine modules from each pool of the plurality of application engine module pools can be allocated to users in real-time. In the present disclosure, "real-time" can refer to processing that can occur instantaneously or within a short period of time (e.g., a few seconds) so that there are minimal delays between when the request is received and when the request is processed and the response provided. The computing resources allocated to a reserved application engine module for an active session can be deleted or otherwise deallocated immediately (or nearly immediately) once the active session ends and the reserved application engine module is no longer needed for that active session. In some implementations of the present invention, such freed up computing resources can be re-allocated by, for example, the application engine inventory and reservations module 136 and/or the application engine scaler module 138 to add and pre-warm another application engine module in the associated application engine module pool or a different application engine module pool, rather than maintaining computing resources for a reserved application engine module that is no longer needed for an inactive session.

The size of each or any of the plurality of application engine module pools can be fixed or dynamic. For example, the size of an application engine module pool can be fixed such that a predetermined application engine module pool size number of pre-warmed application engine modules can be maintained in the pool. As pre-warmed application engine modules in an application engine module pool are allocated, the application engine inventory and reservations modules 136 and/or the application engine scaler module 138 can replace the allocated application engine modules with additional pre-warmed application engine modules to maintain the size of the application engine module pool at or around the predetermined application engine module pool size number. The predetermined application engine module pool size number can be based on, for example, usage trends, historical usage information, or other appropriate metrics and the like for the particular application engine module. Accordingly, highly used application engine modules can have a greater predetermined application engine module pool size number while less used application engine modules can have a smaller predetermined application engine module pool size number.

Additionally or alternatively, the size of an application engine module pool can be dynamic. In some implementations of the present invention, the application engine inventory and reservations module 136 and/or the application engine scaler module 138 can monitor in real-time the usage trends of each or any of the plurality of application engine modules 206. For example, as usage trends increase for a particular application engine module, the application engine scaler module 138 can increase the size of the associated application engine module pool (and, therefore, the number of pre-warmed application engine modules maintained in the application engine module pool) to accommodate the greater usage so that application engine module allocation can continue in real-time without added delay. Conversely, as usage trends decrease for a particular application engine module, the application engine scaler module 138 can decrease the size of the associated application engine module pool (and, therefore, the number of pre-warmed application engine modules maintained in the application engine module pool) to accommodate the lower usage so that computing resources are not unnecessarily overused and can be allocated elsewhere. In such an embodiment, the size of each or any of the application engine module pools can be dynamically altered to accommodate periods of increased use (e.g., spikes in usage) as well as lulls in usage to maintain real-time allocation of application engine modules.

In some implementations of the present invention, the application engine inventory and reservations module 136 and/or the application engine scaler module 138 can include a suitable predictive model or use appropriate machine learning/artificial intelligence techniques to determine the size of an application engine module pool of the plurality of application engine module pools. For example, a machine learning model can be trained based on usage trend data for each supported application engine module to modify the application engine module pool size for an application engine module to minimize the amount of time to allocate the application engine module and maintain a reduced allocation time for the real-time application engine module allocation. The machine learning model can then be used to dynamically and appropriately modify the size of the application engine module pool associated with the application engine module based on the usage exhibited at a particular time for that application engine module. The machine learning model can be updated or otherwise adapted as the usage trends for the application engine module change and evolve over time, as monitored by, for example, the application engine inventory and reservations module 136 and/or the application engine scaler module 138. In some implementations of the present invention, the size of each application engine module pool in a subset of the plurality of application engine module pools can be fixed while the size of other application engine module pools in the plurality of application engine module pools can be dynamic. For example, application engine modules that are highly used can be associated with application engine module pools whose sizes are dynamic, while application engine modules that are less used can be associated with application engine module pools whose sizes are fixed. Additionally or alternatively, the size of a particular application engine module pool can be fixed at certain times and dynamic at other times. For example, for an application engine module that generally experiences lower usage, the size of the corresponding application engine module pool can be fixed. However, during (e.g., intermittent) periods of higher usage (e.g., usage spikes), the size of the corresponding application engine module pool can be dynamic. The application engine inventory and reservations module 136 and/or the application engine scaler module 138 can switch the size of the application engine module pool back to fixed once the period of higher usage ends. In this way, the application engine inventory and reservations module 136 and/or the application engine scaler module 138 can adapt to changing usage conditions as necessary to maintain a reduced allocation time for the real-time allocation of application engine modules.

In some implementations of the present invention, the one or more application engine module pools can be maintained in and with the plurality of application engine modules 206, as illustrated in FIG. 2. However, in some implementations of the present invention, each or any of the one or more application engine module pools can be maintained in or with the application engine module controller 104 outside of the plurality of application engine modules 206 but within the server system 102. Additionally or alternatively, each or any of the one or more application engine module pools can be maintained in or with the server system 102, but outside of the application engine module controller 104, such as, for example, in databases 146. Additionally or alternatively, each or any of the one or more application engine module pools can be maintained in or with a suitable cloud or server storage system that is remote from and in communication with the server system 102.

As illustrated in FIGS. 1 and 2, the server system 102 can include a session management controller 140 for managing active sessions. The session management controller 140 can be in communication with the application engine reservation controller 134. In some implementations of the present invention, the session management controller 140 can also be coupled to or otherwise in communication with the application engine module controller 104. The session management controller 140 can include a session manager module 142 for managing the allocation of application engine modules, including registration, deregistration, and scaling (e.g., in communication and coordination with the application engine inventory and reservations module 136 and the application engine scaler module 138). The session manager module 142 can also act as coordinator for the server system 102 to support, for example, load balancing and latency. The session manager module 142 can receive a request from the client device to initiate an active session. Additionally, the session manager module 142 can receive session information from the client device (e.g., in addition to or as part of the request) that can be used to select an appropriate application engine module. In an embodiment, the session information received from the client device can include, for example, one or more characteristics of the cloud-based client application for which an active session is requested, one or more characteristics of the client device (e.g., client device type, operating system, etc.), and other like characteristics or data.

The session management controller 140 can include an application engine selector module 144 in communication with the session manager module 142. The session manager module 142 can pass the received session information to the application engine selector module 144, which can use such information to select an appropriate application engine module for the requested active session. For purposes of illustration and not limitation, a user with a non-Android client device, such as, for example, a PC laptop, can request an active session with a (cloud-based) klondike solitaire mobile game designed to run on an Android smartphone. Based on the session information passed to the application engine selector module 144, the application engine selector module 144 can select an Android emulator for the (cloud-based) klondike solitaire mobile game for the active session. The application engine selector module 144 can be in communication with the application engine inventory and reservations module 136. Consequently, the application engine selector module 144 can instruct the application engine inventory and reservations module 136 to reserve an Android application engine module for the (cloud-based) klondike solitaire mobile game from the plurality of application engine modules 106 or 206. Once reserved, the Android klondike solitaire mobile game application engine module can be bound to the requested active session so that no other user can use that reserved application engine module during the active session. The application engine selector module 144 can issue a command (e.g., passed to the reserved Android mobile game application engine module via the application engine inventory and reservations module 136) to start the (cloud-based) klondike solitaire mobile game in the Android application engine module. The user can then begin remotely interacting with the (cloud-based) klondike solitaire mobile game via their PC laptop as if the klondike solitaire mobile game was executing natively on the PC laptop itself. If an Android klondike solitaire cloud-based mobile game application engine module is not available, the application engine inventory and reservations module 136 can instruct the application engine scaler module 138 to add and reserve an Android klondike solitaire cloud-based client game application engine module to the plurality of application engine modules 106 or 206 in the manner described above.

In some implementations of the present invention, the session management controller 140 (e.g., the session manager module 142 and the application engine selector module 144) can coordinate with and control the application engine reservation controller 134 (e.g., the application engine inventory and reservations module 136 and application engine scaler module 138) to manage the one or more application engine module pools as illustrated and discussed with respect to FIG. 2. Additionally or alternatively, the session management controller 140 can directly coordinate with and control the application engine module controller 104 to manage the one or more application engine module pools.

In an embodiment, since the application engine reservation controller 134 can identify and maintain, for example, usage trends for application engine modules (e.g., per user, for all users, or any subset thereof), some implementations of the present invention can also recommend cloud-based client applications to each or any user. In an embodiment, the session manager module 142 can include a recommendations engine or the like. The recommendations engine can receive usage trend information from the application engine reservation controller 134 and use such information to recommend different cloud-based client applications to users. For example, the recommendations engine can recommend the most popular cloud-based client application (e.g., overall, in a particular genre, for users using a particular type of client device, etc.), a list of most popular cloud-based client applications at a particular time or over a range of time (e.g., the past hour, the past day, the past week, etc.), and the like. The recommendations engine can also recommend cloud-based client applications that are similar to or complement one or more cloud-based client applications with which a user has interacted previously. For example, if the user has played a cloud-based klondike solitaire mobile game, the recommendations engine can recommend other cloud-based games in the same or similar genre (e.g., spider solitaire, tri peaks solitaire, etc.), regardless of the device platform on which the game is based (since the device platform will be emulated by one of the plurality of application engine modules 106 or 206). Other recommendations are possible. Additionally or alternatively, suitable machine learning/artificial intelligence techniques can be used by the recommendation engine to dynamically provide cloud-based client application recommendations to users. For example, a machine learning model can be trained based on usage data from users (e.g., usage trends for all users or any subset thereof, peak usage, off-hour usage, etc.). The machine learning model can then be used to dynamically recommend cloud-based client applications to users based on the usage trends. The machine learning model can be updated or otherwise adapted as the usage data evolves over time. Such recommendations can be communicated to the client device (e.g., as a URL or other link or hyperlink in a modal window or other appropriate notification or message). If a user accepts a recommendation (e.g., by selecting a URL or other link or hyperlink to the cloud-based client application), the session manager module 142 can have the indicated application engine module selected and reserved in the manner described herein to initiate an active session for the user.

The server system 102 can include one or more databases 146 that can be in communication with one or more of the application engine module controller 104, the application engine reservation controller 134, and the session management controller 140. The databases 146 can be cloud-based or reside in one or more physical storage systems. The databases 146 can include, for example, any suitable information related to the application engine modules, management of the application engine modules, active session information, historical session information, usage trend or other metric data, cloud-based client application state data, copies of each or any cloud-based client application, input from the client devices, session logs, and other like data.

In some implementations of the present invention, the cloud-based client application platform 100 or 200 can include one or more client devices 148 in communication with the server system 102 (e.g., via the Internet or other suitable network). According to embodiments, the client device 148 can be any suitable type of device that is capable of running an appropriate browser or other suitable application through which a user can interact (e.g., via touchscreen or pointing device, such as a mouse, stylus, or the like), such as, for example, a smartphone, a tablet, a laptop, a desktop computer, a game console, a smart television, a smart watch, or any other appropriate device that is capable of supporting such user input and interaction through the browser or other suitable application. In embodiments, the present invention can support interaction with any appropriate type of cloud-based client application on any suitable number of client devices 148 each running any appropriate type of operating system and independent of the underlying hardware and device characteristics of the client device 148.

The cloud-based client application can be any appropriate client application that is configured to execute natively on any suitable type of client device 148, but can be remotely executed and rendered in the cloud in an application engine module of the plurality of application engine modules 106 or 206 of the server system 102 in accordance with embodiments of the present invention. The cloud-based client application, such as, for example, a cloud-based mobile game or other web-based or suitable cloud-based client application, can be remotely provided as an end-user client application with which the users can interact via the server system 102. The cloud-based client application can relate to and/or provide a wide variety of functions and information, including, for example, entertainment (e.g., a game, music, videos, etc.), business (e.g., word processing, accounting, spreadsheets, etc.), news, weather, finance, sports, etc. In certain embodiments, the cloud-based client application can provide a digital game, such as a mobile digital game, a PC game, or a console game. The digital game can be or include, for example, a sports game, an adventure game, a virtual playing card game, a virtual board game, a puzzle game, a racing game, or any other appropriate type of digital game. In an embodiment, the digital game can be an asynchronous competitive skill-based game, in which players can compete each against other in the digital game, but do not have to play the digital game at the same time. In an alternative embodiment, the digital game can be a synchronous competitive skill-based game, in which players can play the digital game at the same time and can compete against each other in the digital game in real-time. Other suitable cloud-based digital games are possible, whether mobile-based, PC-based, console-based, or otherwise. For cloud-based client applications in which two or more users can compete against or otherwise engage with each other, each user can interact with the cloud-based client application in a respective reserved and assigned application engine module and compete, play against, or otherwise engage each other using the respective application engine modules and the backend architecture supported by the cloud-based client application (e.g., game servers and the like in the context of digital games). Additionally or alternatively, one or more users interacting with the cloud-based client application in a respective reserved and assigned application engine module can compete, play against, or otherwise engage or interact with users who are interacting with the client application installed directly and executing natively on their client device (i.e., without the use of application engine modules). Consequently, embodiments of the present invention can allow users across a wide variety of different computing platforms to engage with each other independent of the underlying client device 148 and operating platform used by each or any user for their client device 148.

The client device 148 can include a browser module 150. The browser module 150 can support any suitable type of browser application, such as, for example, Google Chrome, Mozilla Firefox, Microsoft Edge, Apple Safari, DuckDuckGo, Opera, Brave, Vivaldi, Firefox Focus, a proprietary browser, or the like. Additionally or alternatively, the browser module 150 can be a suitable application capable of supporting the local rendering of the video/audio information streamed from the cloud-based client applications to the client device 148 (e.g., via OpenGL or the like). In an embodiment, the browser module 150 can include a display module 152, an interaction capture module 154, and a session information module 156 in communication with each other. The display module 152 can support the display of video and/or audio information streamed from the cloud-based client application running in the corresponding application engine module executing on the server system 102. In an embodiment, the video/audio output of the cloud-based client application running in an application engine module can be streamed in real-time via the Internet (or other suitable network) to the browser module 150 on the client device 148 and displayed to the user via the display module 152. The display module 152 can receive the streamed video/audio output from the application engine module via the video/audio communication module 132 and render it appropriately on the display screen of the client device 148. The user can interact with the video/audio stream of the cloud-based client application in real-time. In some implementations of the present invention, the user's inputs can be collected by the interaction capture module 154 and communicated (over the Internet or other suitable network) to the application engine module in the plurality of application engine modules 106 or 206 that has been assigned to the user's active session via client device signaling communication module 158 (e.g., a suitable data and signaling channel, such as a gRPC gateway or the like). The user's inputs can then be mapped to the video/audio stream by the state module of the assigned application engine module to allow the user to (remotely) control and interact with the cloud-based client application in real-time as if the cloud-based client application was running natively on the client device 148.

Figure 3:
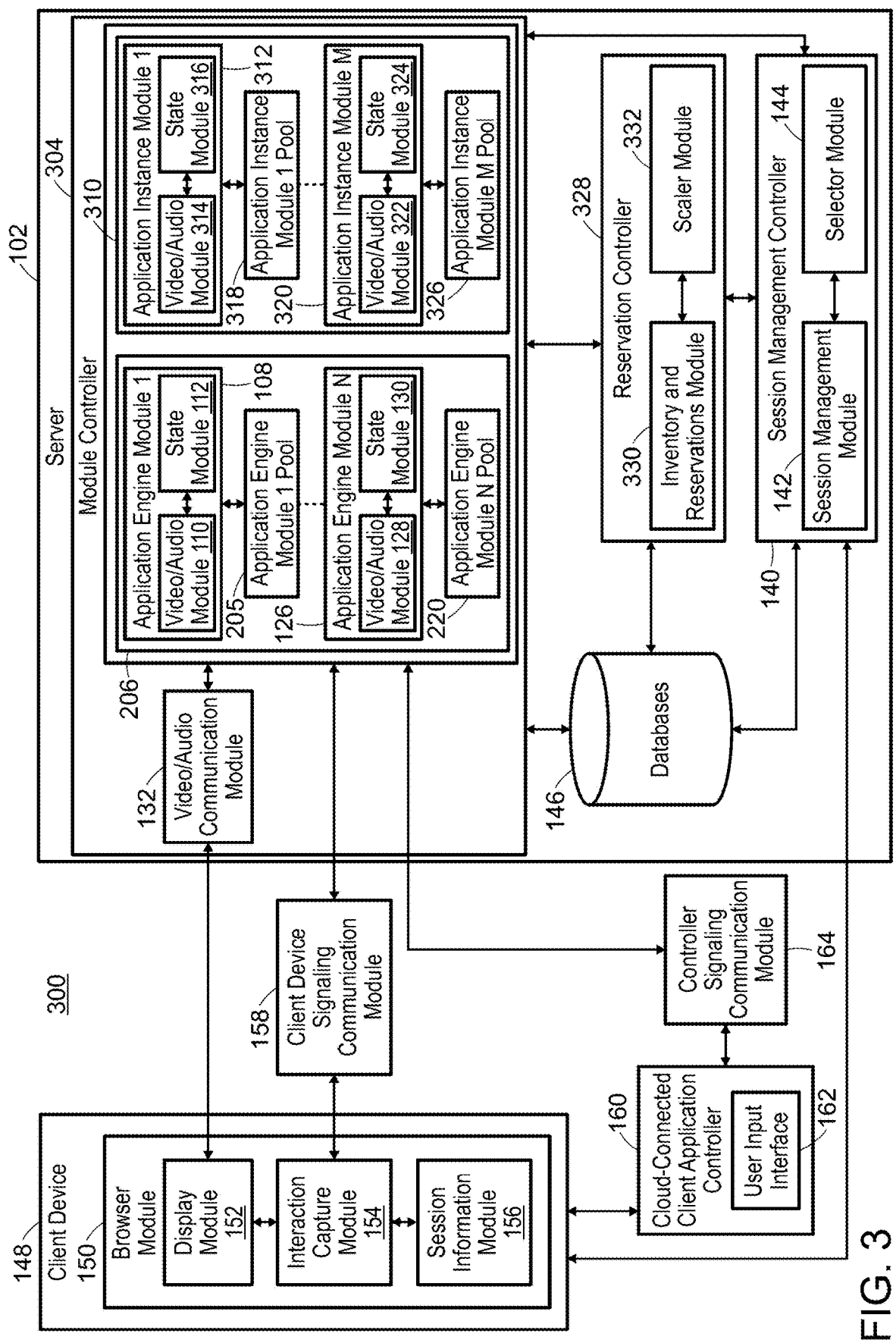
FIG. 3 is a block diagram illustrating an example cloud-based client application platform with a plurality of application engine module pools and a plurality of application instance module pools for remotely controlling cloud-based client applications.

In an embodiment, the display module 152 can also provide a display of any or all cloud-based client applications that are available for use by the user (e.g., as URLs or other links or hyperlinks in the browser application, as linked icons on a desktop in the user interface of the client device 148, etc.). The interaction capture module 154 can capture the user's selection of a desired cloud-based client application (e.g., by the user clicking on or otherwise selecting one of the displayed URLs, links, hyperlinks, or icons). Once the user selects a desired cloud-based client application, the session information module 156 can initiate an active session (e.g., via a REST call or the like) by communicating the request to the session management controller 140. The session management controller 140 can then begin the process of reserving an appropriate application engine module for the active session, as described above. The session information module 156 can poll the session management controller 140 periodically (e.g., via REST or the like) until an application engine module has been reserved and assigned for an active session. Alternatively, the session management controller 140 can transmit a suitable message or notification to the session information module 156 when an application engine module has been reserved and assigned for the active session. Once the application engine module has been reserved and assigned to the user's active session, the display module 152 on the client device 148 can connect to the reserved application engine module through the media (video/audio) channel (e.g., via video/audio communication module 132) and begin receiving the streamed video/audio media data from the cloud-based client application. As the user interacts with the video/audio media data being streamed from the cloud-based client application executing within the reserved application engine module, the interaction capture module 154 can provide the captured user input to the reserved application engine module via the client device signaling communication module 158 (e.g., webRTC signaling, via OpenGL, or other suitable technology) to allow the user to (remotely) control and interact with the cloud-based client application. FIG. 3 is a block diagram illustrating an example cloud-based client application platform 300 with a plurality of application engine module pools and a plurality of application instance pools for remotely controlling cloud-based client applications, in accordance with embodiments of the disclosure. As discussed previously, each of the application engine modules in the plurality of application engine modules 206 can be configured to emulate a particular type and configuration of client device for executing a cloud-based client application. Additionally or alternatively, the server system 102 can support cloud-based client application instances (also referred to as "application instances") that can be designed and configured to execute natively in the cloud on the server system 102. Thus, an application instance can be an instance of a cloud-based client application that can be configured to run natively on the server system 102 without the use of an application engine module from the plurality of application engine modules 206 (or 106). Accordingly, the server system 102 can include a module controller 304, which can operate in a manner similar to that discussed and described with respect to the application engine module controller 104 of FIGS. 1 and 2. The module controller 304 can include a plurality of application engine modules 206 to support and emulate any appropriate type of client device to execute any suitable type of cloud-based client application (as discussed and described with respect to FIGS. 1 and 2). The module controller 304 can also include a plurality of application instance modules 310 to support and execute any appropriate type of application instance that can run natively on the server system 102. The module controller 304 can allow registration/deregistration of application instance modules, atomic reservation of application instance modules, querying of application instance modules, and the like in a manner similar to that described for the plurality of application engine modules 206 (and 106). The plurality of application instance modules 310 can include a first application instance module 312, . . . , and a Mth application instance module 320, where M can be any suitable natural number and can vary over time. Each application instance module 312, . . . 320 can include a video/audio module for managing video and/or audio media data generated by the application instance and transmitting such video and/or audio media data to a client device for display to a user. Each application instance module 312, . . . 320 can also include a state module for receiving and processing input (e.g., mapping input to the video/audio stream, etc.) from the client device 148 generated while the user (remotely) interacts with the application instance. Each state module can also maintain the state of the application instance. For example, the first application instance module 312 can include a first video/audio module 314 in communication with a first state module 316. The Mth application instance module 320 can include a Mth video/audio module 322 in communication with a Mth state module 324. The module controller 304 can maintain any suitable number of application instance modules and register (i.e., instantiate, allocate, or otherwise create) or deregister (i.e., delete or deallocate) application instance modules as necessary. In an embodiment, the server system 102 can include a plurality of module controllers 304, with each module controller 304 managing respective pluralities of application engine modules 206 to form application engine module clusters and respective pluralities of application instance modules 310 to form application instance module clusters. The server system 102 and the module controller 304 can support any suitable number and combination of application engine modules and application instance modules.

As illustrated in FIG. 3, the server system 102 can include a reservation controller 328 in communication with the module controller 304, which can operate in a manner similar to that discussed and described with respect to the application engine reservation controller 134 of FIGS. 1 and 2. In embodiments, the reservation controller 134 can also control various aspects of the plurality of application instance modules 310, including, for example, orchestrating application instance module scaling, controlling application instance module access, managing application instance module initialization for users, and the like. The reservation controller 328 can include an inventory and reservations module 330, which can operate in a manner similar to that discussed and described with respect to the application engine inventory and reservations module 136 of FIGS. 1 and 2. The inventory and reservations module 330 can also track and manage the inventory of all application instance modules in the plurality of application instance modules 310. The inventory and reservations module 330 can grant application instance module reservations for use in active sessions. In some implementations of the present invention, when a user requests initiation of an active session with an application instance module, the inventory and reservations module 330 can reserve an appropriate application instance module, populate or cause to populate the application instance module with the appropriate user and/or application data (e.g., user profile information, user account information, application instance state data, etc. to support user interaction and engagement with the application instance), and bind the reserved application instance module to that active session. If no application instance module is available for the active session, the inventory and reservations module 330 can instruct the module controller 304 (e.g., via the scaler module 332, discussed below) to add and register a new application instance module for use in the requested active session. In some implementations of the present invention, the registration process can be performed asynchronously. For example, the inventory and reservations module 330 can wait for the new application instance module to be added and reserved by polling the module controller 304 periodically or receiving an appropriate message from the module controller 304 once the task has been completed. Once the application instance module is registered, it can be reserved for and bound to the active session. In some implementations of the present invention, the application instance module that has been reserved for the active session can be accessible only to the user that requested it, and only for the lifespan of the active session. In other words, an application instance module that has been reserved for a particular active session may not be used or accessed by another user during that active session. In some implementations of the present invention, the data stored in or otherwise used by the reserved application instance module during the active session can be ephemeral. For example, the application instance module can be deregistered at the end of an active session. Accordingly, any and all data stored or otherwise used by the application instance module during that active session can be deleted, for example, no later than the deregistration of the application instance module. In an alternative embodiment, the data stored in or otherwise used by the reserved application instance module during the active session can be stored (e.g., in databases 146), retrieved, and used in a subsequent active session by the user. Once the application instance module has been deregistered, it can be reused for another active session or its computing resources can be reallocated to a different application instance module.

In embodiments, the reservation controller 328 can include a scaler module 332 in communication with the inventory and reservations module 330, which can operate in a manner similar to that discussed and described with respect to the application engine scaler module 138 of FIGS. 1 and 2. The scaler module 332 can also respond to inventory and reservation changes by adding and instantiating new application instance modules to the plurality of application instance modules 310. The scaler module 332 can proactively scale the number of application instance modules in the plurality of application instance modules 310 based on, for example, usage trends or other suitable metrics to maintain a sufficiently-sized pool of reservable application instance modules. For example, the scaler module 332 can store a predetermined threshold (e.g., provided or generated based on usage trends or other suitable metrics) for the size of the pool of the plurality of application instance modules 310. If the number of reservable application instance modules decreases below the predetermined threshold, the scaler module 332 can add new application instance modules to the plurality of application instance modules 310 to increase the number of reservable application instance modules above the predetermined threshold. If the increase in the number of reservable application instance modules becomes too great (e.g., above a second predetermined threshold), the scaler module 332 can either do nothing or can delete or otherwise deallocate unneeded extra application instance modules from the plurality of application instance modules 310. Additionally or alternatively, suitable machine learning/artificial intelligence techniques can be used by or with the scaler module 332 to appropriately and dynamically scale the number of reservable application instance modules in the plurality of application instance modules 310. For example, a machine learning model can be trained based on usage data from users (e.g., usage trends, peak usage, off-hour usage, etc.). The machine learning model can then be used to dynamically add and delete/deallocate application instance modules in the plurality of application instance modules 310. The machine learning model can be updated or otherwise adapted as the usage data evolves over time.

In some implementations of the present invention, each or any of the plurality of application instance modules 310 can be associated and in communication with a separate application instance module pool that can be maintained by, for example, the inventory and reservations module 330 and/or the scaler module 332, with each application instance module pool supporting an individual type of application instance module or a set of related types of application instance modules. In such an embodiment, each application instance can have or be associated with its own individual application instance module pool. For example, each pool of the plurality of application instance module pools can be configured to support a single application instance, such that each pool of the plurality of application instance module pools can be allocated on a per application instance basis. For purposes of illustration and not limitation, a klondike solitaire game designed to run natively on the server system 102 can be supported by the first application instance module 312, which can be associated with a first application instance module pool 318 of first application instance modules. A bingo game designed to run natively on the server system 102 can be supported by the Mth application instance module 320, which can be associated with an Mth application instance module pool 326 of Mth application instance modules, and so forth. Any suitable number of application instance module pools can be maintained and supported for any appropriate number of application instance modules by, for example, the inventory and reservations module 330 and/or the scaler module 332, depending on, for instance, the number of application instances supported by the system or any appropriate subset thereof.

In some implementations of the present invention, each or any of the application instance modules in each pool of the plurality of application instance module pools can be "pre-warmed." For example, the application instance modules in each pool of the plurality of application instance module pools can be pre-allocated and pre-instantiated within the application instance module pool and then put into standby or sleep mode by, for instance, the inventory and reservations module 330 and/or the scaler module 332. By spinning up the application instance modules in each application instance module pool in the background and maintaining those spun-up application instance modules in a standby mode, an application instance module can be immediately (or nearly immediately) reserved and assigned to a user upon request of an active session with little or no concomitant delay, since awakening an application instance module that is in standby mode can take substantially less time than instantiating the application instance module from scratch. Once an application instance module in an application instance module pool is reserved and assigned, the reserved and assigned application instance module can be immediately (or nearly immediately) replaced by another "pre-warmed" application instance module from the corresponding application instance module pool so that it can be ready for immediate (or nearly immediate) reservation by and assignment to the next user requesting an active session. Such a "pre-warmed" replacement process can continue as each application instance module in an application instance module pool is reserved and assigned. In such a manner, application instance modules from each pool of the plurality of application instance module pools can be allocated to users in real-time. The computing resources allocated to a reserved application instance module for an active session can be deleted or otherwise deallocated immediately (or nearly immediately) once the active session ends and the reserved application instance module is no longer needed for that active session. In some implementations of the present invention, such freed up computing resources can be re-allocated by, for example, the inventory and reservations module 330 and/or the scaler module 332 to add and pre-warm another application instance module in the associated application instance module pool or a different application instance module pool, rather than maintaining computing resources for a reserved application instance module that is no longer needed for an inactive session.

The size of each or any of the plurality of application instance module pools can be fixed or dynamic. For example, the size of an application instance module pool can be fixed such that a predetermined application instance module pool size number of pre-warmed application instance modules can be maintained in the pool. As pre-warmed application instance modules in an application instance module pool are allocated, the inventory and reservations module 330 and/or the scaler module 332 can replace the allocated application instance modules with additional pre-warmed application instance modules to maintain the size of the application instance module pool at or around the predetermined application instance module pool size number. The predetermined application instance module pool size number can be based on, for example, usage trends or other historical usage information and the like for the particular application instance module. Accordingly, highly used application instance modules can have a greater predetermined application instance module pool size number while less used application instance modules can have a smaller predetermined application instance module pool size number.

Additionally or alternatively, the size of an application instance module pool can be dynamic. In some implementations of the present invention, the inventory and reservations module 330 and/or the scaler module 332 can monitor in real-time the usage trends of each or any of the plurality of application instance modules 310. For example, as usage trends increase for a particular application instance module, the scaler module 332 can increase the size of the associated application instance module pool (and, therefore, the number of pre-warmed application instance modules maintained in the application instance module pool) to accommodate the greater usage so that application instance module allocation can continue in real-time without added delay. Conversely, as usage trends decrease for a particular application instance module, the scaler module 332 can decrease the size of the associated application instance module pool (and, therefore, the number of pre-warmed application instance modules maintained in the application instance module pool) to accommodate the lower usage so that computing resources are not unnecessarily overused and can be allocated elsewhere. In such an embodiment, the size of each or any of the application instance module pools can be dynamically altered to accommodate periods of increased use (e.g., spikes in usage) as well as lulls in usage to maintain real-time application instance module allocation.

In some implementations of the present invention, the inventory and reservations module 330 and/or the scaler module 332 can include a suitable predictive model or use appropriate machine learning/artificial intelligence techniques to determine the size of an application instance module pool of the plurality of application instance module pools. For example, a machine learning model can be trained based on usage trend data for each supported application instance module to modify the application instance module pool size for an application instance module to minimize the amount of time to allocate the application instance module and maintain a reduced allocation time for the real-time application instance module allocation. The machine learning model can then be used to dynamically and appropriately modify the size of the application instance module pool associated with the application instance module based on the usage exhibited at a particular time for that application instance module. The machine learning model can be updated or otherwise adapted as the usage trends for the application instance module change and evolve over time, as monitored by, for example, the inventory and reservations module 330 and/or the scaler module 332.

In some implementations of the present invention, the size of each application instance module pool in a subset of the plurality of application instance module pools can be fixed while the size of other application instance module pools in the plurality of application instance module pools can be dynamic. For example, application instance modules that are highly used can be associated with application instance module pools whose sizes are dynamic, while application instance modules that are less used can be associated with application instance module pools whose sizes are fixed. Additionally or alternatively, the size of a particular application instance module pool can be fixed at certain times and dynamic at other times. For example, for an application instance module that generally experiences lower usage, the size of the corresponding application instance module pool can be fixed. However, during (e.g., intermittent) periods of higher usage (e.g., usage spikes), the size of the corresponding application instance module pool can be dynamic. The inventory and reservations module 330 and/or the scaler module 332 can switch the size of the application instance module pool back to fixed once the period of higher usage ends. In this way, the inventory and reservations module 330 and/or the scaler module 332 can adapt to changing usage conditions as necessary to maintain a reduced allocation time for the real-time allocation of application instance modules.

In some implementations of the present invention, the one or more application instance module pools can be maintained in and with the plurality of application instance modules 310, as illustrated in FIG. 3. However, in some implementations of the present invention, each or any of the one or more application instance module pools can be maintained in or with the module controller 304 outside of the plurality of application instance modules 310 but within the server system 102. Additionally or alternatively, each or any of the one or more application instance module pools can be maintained in or with the server system 102, but outside of the module controller 304, such as, for example, in databases 146. Additionally or alternatively, each or any of the one or more application instance module pools can be maintained in or with a suitable cloud or server storage system that is remote from and in communication with the server system 102.

In some implementations of the present invention, the reserved and assigned application engine module and/or the reserved and assigned application instance module can each be associated with a different, unique application engine module identification (ID) number or other suitable identifier (e.g., comprised of numeric or alphanumeric characters or the like) that uniquely identifies the reserved and assigned application engine module and/or the reserved and assigned application instance module during the active session. The module ID can be used by, for example, the session management controller 140 to track and manage the reserved and assigned application engine module and/or the reserved and assigned application instance module during the active session to ensure that communications from the client device 148 during the active session are addressed and forwarded to the correct application engine module or application instance module and vice versa, and the like. In an embodiment, when the active session has completed, the session information module 156 can send an appropriate message to the session management controller 140 so that the session management controller 140 can disconnect the active session and deregister the application engine module or the application instance module used during the active session. In some implementations of the present invention, any and all data stored or otherwise used by the registered application engine module or the registered application instance module during that active session can be deleted upon deregistration of the application engine module or the application instance module. In an alternative embodiment, the data stored in or otherwise used by the reserved application engine module or the reserved application instance module during the active session can be stored (e.g., in databases 146), retrieved, and used in a subsequent active session by the user. Once the application engine module or the application instance module has been deregistered, it can be reused for another active session or its computing resources can be reallocated to a different application engine module or application instance module.

In some implementations of the present invention, the cloud-based client application platforms 100, 200, and 300 illustrated in FIGS. 1, 2, and 3, respectively, can include one or more cloud-connected client application controllers 160. According to embodiments, the cloud-connected client application controller 160 can be any suitable type of device that is capable of receiving and transmitting user input to control a cloud-based client application executing in an application engine module. For example, in the context of mobile games, the cloud-connected client application controller 160 can be a game console controller or the like, although other types of cloud-connected client application controllers 160 are possible. The cloud-connected client application controller 160 can include a user input interface 162 for receiving user input from the user and transmitting such user input to the server system 102 to control the cloud-based client application running in the application engine module or the application instance module. In an embodiment, neither the cloud-connected client application controller 160 nor the user input interface 162 includes a display or keyboard or the like, sometimes referred to as a "headless device." For example, the cloud-connected client application controller 160 can communicate or otherwise be remotely connected to a client device 148, and the display module 152 of the client device 148 can be used to display the video and/or audio information streamed from the cloud-based client application running in the corresponding application engine module or application instance module executing on the server system 102. In an embodiment, the video/audio output of the cloud-based client application running in an application engine module or the application instance module can be streamed in real-time via the Internet (or other suitable network) to the browser module 150 on the client device 148 and displayed to the user via the display module 152. The display module 152 can receive the video/audio output from the application engine module (or the application instance module) via the video/audio communication module 132. The user can interact with the video/audio stream of the cloud-based client application in real-time using the cloud-connected client application controller 160 instead of the interaction capture module 154 on the client device 148. In an embodiment, the user's inputs can be collected by the cloud-connected client application controller 160 and communicated (over the Internet or other suitable network) to the application engine module in the plurality of application engine modules 106 or 206 (or to the application instance module in the plurality of application instance modules 310) that has been assigned to the user's session via a controller signaling communication module 164. For example, the controller signaling communication module 164 can be a suitable wireless network access point (e.g., a Wi-Fi access point or the like), a network gateway, or the other appropriate network communications portal that can communicate with the server system 102 via the Internet or other appropriate network connection. The user's inputs from the cloud-connected client application controller 160 can then be mapped to the video/audio stream by the state module of the assigned application engine module or application instance module to allow the user to (remotely) control and interact with the cloud-based client application in real-time as if the cloud-based client application was running locally and natively on the client device 148. However, in an alternative embodiment, the cloud-connected client application controller 160 can include either or both of a display or keyboard, such as in or associated with the user input interface 162.

In embodiments, the user input interface 162 can include any suitable number of buttons or keys in any appropriate configuration (e.g., buttons for A, B, X, Y, and/or arrows for up, down, left, right, or the like). For example, the user input interface 162 can include one or more button layouts, with each button layout including any suitable number of buttons or keys in any appropriate configuration. For example, the button layouts can be similar to game console controllers, such as with two analog sticks, a directional pad ("D-pad"), four right-side input buttons, four shoulder buttons and two triggers. The user input interface 162 can additionally or alternatively include menu, function, and backside paddle inputs, although other combinations of buttons, triggers, paddles, joysticks, and the like are possible. The configuration of the one or more button layouts will depend on, for example, the type(s) of cloud-based client applications available in the cloud-based client application platform 100 and how those cloud-based client applications can be controlled by the cloud-connected client application controller 160.

In embodiments, by remotely connecting the cloud-connected client application controller 160 to the server system 102 to receive and transmit user input, rather than through the client device 148, the signal latency between the cloud-connected client application controller 160 and the server system 102 can be substantially reduced. The cloud-connected client application controller 160 can include suitable electronics, such as, for example, a wireless networking chip, a microprocessor and/or other appropriate electronic components, capable of initiating and managing a wireless network connection with the server system 102. In an embodiment, users on-the-go can opt to connect their cloud-connected client application controller 160 over a wireless hotspot or the like as supported by the controller signaling communication module 164. In addition to a cloud connection, the cloud-connected client application controller 160 can provide a local connection mode to either interface with the client device 148 interfacing or otherwise engaging with a cloud-based client application or with an application running on the client device 148 itself. Such a mode can be user selectable or automatic, depending on the preference. For example, external factors, such as, for example, the presence of a wireless connection within range of the client device 148 or a host Bluetooth device, can be used to determine the connection mode of the cloud-connected client application controller 160 in an appropriate manner that is fully transparent to the user.

Some implementations of the present invention can overcome the remote connection challenges with a cloud-connected client application controller 160 that does not have a display and/or keyboard. For example, through the use of IoT and/or home automation techniques, various pairing methods can be used that are not dependent on having a display. For instance, once the cloud-connected client application controller 160 gains access to an internet-enabled wireless or other remote connection access point via the controller signaling communication module 164, various methods can be used for wirelessly pairing and connecting to the server system 102. For purposes of illustration and not limitation, Wi-Fi provisioning is the process of connecting a new Wi-Fi device to a Wi-Fi network. The Wi-Fi provisioning process can include loading the cloud-connected client application controller 160 with the network name (often referred to as Service Set Identifier or SSID) and its security credentials. Through provisioning, the cloud-connected client application controller 160 can be connected to the server system 102 or to a suitable edge network that is in communication with the server system 102, instead of through the client device 148, to allow the cloud-connected client application controller 160 to connect to and communicate with the plurality of application engine modules 106 in the application engine module controller 104 or with the plurality of application instance modules 310 in the module controller 304 to reduce latency, manage load balancing and server resources, etc. Various methods of Wi-Fi provisioning can be supported by the cloud-connected client application controller 160 and the server system 102.

For example, in some implementations of the present invention, the cloud-connected client application controller 160 can use an Access Point (AP) mode. The AP mode is the most common provisioning method for headless devices. In the AP mode, an un-provisioned device (e.g., the cloud-connected client application controller 160) can wake up initially as a Wi-Fi AP with an SSID defined by, for example, the equipment manufacturer. In such a mode, the un-provisioned device can also include a secured embedded web server. The user can connect a client device 148 to the un-provisioned device's AP and use the browser module 150 to browse into the un-provisioned device's website via a predefined local URL or IP address. In the embedded website, the user can choose (or type in) the wireless network name and password. The cloud-connected client application controller 160 can store the network credentials in nonvolatile memory or the like and can then switch from AP mode to Station mode to connect to the wireless network using the stored network credentials (e.g., via the controller signaling communication module 164). The primary benefit of AP mode provisioning is that it can use various capabilities that can exist in the client device 148.

Additionally or alternatively, in some implementations of the present invention, the cloud-connected client application controller 160 can use out-of-band provisioning. The out-of-band provisioning method can use a non-Wi-Fi medium to deliver the network information to the provisioned device (e.g., the cloud-connected client application controller 160). Out-of-band provisioning can be wired (e.g., using a USB interface) or wireless (e.g., using a near field communication (NFC) radio or Bluetooth). In an embodiment, the cloud-connected client application controller 160 can include a suitable NFC chip or the like, and NFC-based out-of-band provisioning can be used for the cloud-connected client application controller 160. Adding out-of-band provisioning to the cloud-connected client application controller 160 can add robustness and flexibility, although it could increase the solution cost.

Additionally or alternatively, in some implementations of the present invention, the cloud-connected client application controller 160 can use Wi-Fi Easy Connect. Wi-Fi Easy Connect can simplify device configuration through the use of QR codes, NFC tags, or downloaded device information from the cloud to enable zero-touch connection to a Wi-Fi network (e.g., via controller signaling communication module 164). The client device 148 can be used to manage network access. In Wi-Fi Easy Connect, a user can use the client device 148 to scan the QR code or NFC tag of the AP (e.g., the controller signaling communication module 164) to establish the wireless network. The user can then use the client device 148 to scan the QR code or NFC tag of the cloud-connected client application controller 160 to provision and enroll the device. The cloud-connected client application controller 160 can then seamlessly connect to the wireless network via the controller signaling communication module 164.

Additionally or alternatively, in some implementations of the present invention, Wi-Fi Protected Setup (WPS) can be used. WPS is a standard for provisioning headless devices. In an embodiment, the cloud-connected client application controller 160 can be WPS-enabled. In the Push-Button- Connect (PBC) method for WPS, the user can push a button on both the AP (e.g., the controller signaling communication module 164) and the cloud-connected client application controller 160. Once the button on the AP is pushed, the cloud-connected client application controller 160 can freely join the network for a period of two minutes. A drawback of such a method, beyond the lack of security during the two-minute period, is that the user must have physical access to the AP. If the AP is located in a hard-to-reach place, such a method can be cumbersome.

Additionally or alternatively, in some implementations of the present invention, the cloud-connected client application controller 160 can use Wireless Accessory Configuration (WAC). The WAC method is an Apple MFi licensed technology designed for MFi accessories that can connect to iPod, iPhone, or iPad (i.e., a client device 148). MFi accessories that support WAC can be easily configured by an iPod, iPhone, or iPad (i.e., a client device 148), without requiring the user to type in the wireless network name or password.

Additionally or alternatively, in some implementations of the present invention, the cloud-connected client application controller 160 can use SmartConfig technology. SmartConfig technology is a Texas Instruments (TI) proprietary provisioning method designed for headless devices. It uses an iOS or Android mobile app (e.g., running on the client device 148) to broadcast the network credentials from the client device 148 to an un-provisioned TI Wi-Fi device (e.g., the cloud-connected client application controller 160). The Wi-Fi network name (SSID) to which the client device 148 is connected can show up automatically on the iOS or Android mobile app. The user can then add the network password and press the "Start" button to begin the process. After the network credentials are picked up by the cloud-connected client application controller 160, it can connect automatically to the wireless network (e.g., via the controller signaling communication module 164) and send out a service discovery message back to the client device 148. However, using an iOS or Android mobile app that may need to be approved by a respective mobile app store may re-introduce the same platform restrictions that embodiments of the present invention seek to alleviate. Other methods of wireless network provisioning are possible.

In embodiments, the cloud-connected client application controller 160 can be used to reduce and improve signal latency, but it can also support techniques for reducing packet loss. Data is transmitted over networks between an origin and a destination on the Internet or any other packet-switched network in small units called packets. Network packets can hold small amounts of data that can include information such as, for example, the source and destination address, protocols or identification numbers and the like. When errors in data transmission or network congestion cause packets to fail to reach their destination, end users may experience disruptions such as slow service or loss of network connectivity. Packet loss can contribute to a lack of communication quality, reduced throughput, less secure communication, and other like issues. For example, real-time applications can experience jitter and frequent gaps in received speech. In the worst cases, packet loss can cause severe mutilation of received data, broken-up images, unintelligible speech or even the complete absence of a received signal. Packet losses of less than about 2% may be noticeable in some scenarios, whereas up to about 10% packet loss may be acceptable in other scenarios. Packet loss in multi-player online games has been a consistent problem, not only from the receiving end but also from the sending side. For example, poor connection quality can cause an affected user's avatar to skip around the screen, disappear, lag, or jitter from other users' perspectives thereby disrupting game play. Some users can even abuse this phenomenon to gain an edge when gaming online. In the cloud-based client application platform 100, packet loss can result in various issues. For example, not only can the user's inputs be delayed, but the return video stream can be disrupted as well. The affected user can experience input lag, but the cloud-based client application can continue to run in the application engine module on the server system 102 as if the user was making zero inputs. Such issues can have a substantial impact on enjoyment, compounding the latency issues that could already be present and affecting the benefits provided by the cloud-connected client application controller 160.

To address such packet loss issues according to some implementations of the present invention, the server system 102 can use suitable artificial intelligence or machine learning techniques to observe and develop a predictive model of a user's control inputs when encountering certain cloud-based client application features. Such a predictive model can be used to smooth over any momentary loss of data from a user's control inputs. For example, the artificial intelligence/machine learning technique can build the model based on usual user reaction times, common errors the user makes, responses to stimuli in the cloud-based client application, and the like. Such a technique can also be deployed to reduce perceived lag on an unstable connection, which can be especially important when the cloud-based client application platform 100 is deployed among multiple users interacting together online.

In an embodiment, the cloud-connected client application controller 160 can effectively make any client device 148 with a web browser a gaming system or other like system tailored to a specific cloud-based client application or genre of cloud-based client applications. For example, the cloud-connected client application controller 160 can act as or be associated with a unique identification or identifier to load profile information or other appropriate information or data associated with the user and/or the cloud-connected client application controller 160 from, for example, the databases 146 of the server system 102 during the Wi-Fi provisioning process. For example, the cloud-connected client application controller 160 can store in on-board memory a unique identifier (e.g., an alphanumeric identification or the like) that can be provided to the server system 102 during the provisioning process. Upon successful completion of the provisioning process, the server system 102 can retrieve profile information or other data associated with the identifier from the databases 146 and transmit such information to the cloud-connected client application controller 160 (e.g., via the controller signaling communication module 164) and/or the client device 148 of the user. The server system 102 can use the identifier to control various aspects of the browser module 150, the information displayed to the user via the browser module 150, and/or cloud-based client applications being displayed via the browser module 150. For example, the server system 102 can display a list of recommended cloud-based client applications to the user in the display module 152 of the client device 148, such as a list of cloud-based client applications that can be used with the cloud-connected client application controller 160. As discussed previously, the cloud-connected client application controller 160 can be equipped with different button layouts or configurations. In an embodiment, depending on the particular button layout for a particular cloud-connected client application controller 160, the identifier can cause the server system 102 to display in the display module 152 of the browser module 150 a list of recommended cloud-based client applications that are suited for use with that particular configuration of the cloud-connected client application controller 160. For example, if the one or more button layouts are configured in a manner similar to a game console controller, then the server system 102 can communicate commands to the browser module 150 to display in the display module 152 a list of recommended cloud-based games that are similar to game console games. In an embodiment, the server system 102 can maintain such a list in the databases 146 and communicate the list to the client device 148 for display.

Additionally or alternatively, the server system 102 can use the identifier to generate and display any suitable type of recommendations list and/or customizations/personalizations of the user experience (e.g., by accessing the information through a look-up table or key-value pairs stored in the databases 146 that is referenced or otherwise accessed based on the identifier). Consequently, the server system 102 can tailor the user experience in the browser module 150 in any suitable manner by modifying the graphical information displayed in the browser module 150 inside and/or outside the cloud-based client application. For example, the server system 102 can use the identifier to retrieve user profiles or preferences to tailor or otherwise customize the user experience through the browser module 150 to the user's preferences. Merely for purposes of illustration and not limitation, the graphical user interface of a cloud-based client application game can be personalized to display, for example, user incentives, special offers, advertisements or the like to the user inside or within the cloud-based client application and/or within or associated with the browser module 150. In embodiments, different user incentives, special offers, advertisements, or the like can be displayed to a user in the cloud-based client application based on, for example, the characteristics associated with the cloud-connected client application controller 160, such as its type and/or configuration, although other characteristics are possible. Additionally or alternatively, the cloud-based client application can personalize, for example, prizes, rewards, and/or gifts displayed or presented to a user in an associated gift store of the cloud-based client application. For example, a user using one type of cloud-connected client application controller 160 can be presented with prizes/rewards/gifts that are different from prizes/rewards/gifts that can be presented to another user using a different type of cloud-connected client application controller 160. In this manner, the menu or list of prizes, rewards, and/or gifts can be tailored to each or any user in the associated gift store displayed in the cloud-based client application. Additionally or alternatively, the server system 102 can personalize, for example, graphical information displayed to the user outside of the cloud-based client application, such as ads or offers surfaced to the player in the browser module 150 outside of the cloud-based client application. Other personalizations and customizations are possible to the graphical user interface inside and/or outside of the cloud-based client application.

In an embodiment, the server system 102 can be configured to support account profiles. For example, the user can create an account profile in the cloud-based client application and/or via the browser module 150, which can be used to store (e.g., in the databases 146) user preferences, such as preferred cloud-based client applications, whether or not the user wants to be presented with recommendations and, if so, what types and kinds of recommendations, and the like. Upon provisioning and connection, the server system 102 can communicate commands to the cloud-based client application and/or the browser module 150 to present those personalizations, customizations, preferences, and the like to the user. For example, the server system 102 can maintain a record of the last cloud-based client application used by the user. Accordingly, server system 102 can communicate one or more commands to the application engine module controller 104 or the module controller 304 to initiate execution of one or more other cloud-based client applications for display in the browser module 150 of the client device 148 of the user, such as the last cloud-based client application used by the user or a cloud-based client application that was most previously used by the user. Such control by the server system 102 can occur at initial setup of the cloud-connected client application controller 160 or at any appropriate time while the cloud-connected client application controller 160 is being used by the user.

In an embodiment, the cloud-connected client application controller 160 can communicate any suitable type of information to the server system 102, such as when the cloud-connected client application controller 160 is being used by the user, the length of time a user uses the cloud-connected client application controller 160, the length of time a user interacts or engages with a cloud-based client application via the cloud-connected client application controller 160, and other like information that can be collected from the user and processed by the server system 102 to improve the user experience by tracking metrics of, for example, engagement and fairness. In an embodiment, for competitive, skill-based cloud-based client applications (e.g., cloud-based competitive mobile games), such information can be used to match users who are using a cloud-connected client application controller 160 against other users who are also using a cloud-connected client application controller 160 to assist in ensuring fairness in the competitions and/or to enforce anti-fraud/anti-cheat measures. For example, one user using a cloud-connected client application controller 160 may have an unfair advantage (e.g., reduced latency, reduced packet loss) in the competition against another user who is not using a cloud-connected client application controller 160. For purposes of illustration and not limitation, the server system 102 can monitor and receive characteristics or attributes of game play of a user. These characteristics, attributes, or statistics can include, for example, whether or not the user is using a cloud-connected client application controller 160 for the cloud-connected client application. The server system 102 can compare the monitored characteristics to historical characteristics (e.g., stored in and retrieved from the databases 146) associated with the user to detect fraudulent behavior. Deviations in the game play characteristics from the historical characteristics can indicate fraudulent behavior. For example, fraudulent behavior can include cheating (e.g., using a cloud-connected client application controller 160 to play a skill-based cloud-based competitive mobile game against players who are not using such a controller).

Additionally or alternatively, users in the competition can be matched based on factors that can include characteristics associated with the cloud-connected client application controller 160, such as, for instance, the type of cloud-connected client application controller 160 being used, the configuration (e.g., button layout configuration) of the cloud-connected client application controller 160 being used, the latency and/or packet loss associated with the cloud-connected client application controller 160, and/or even simply the fact that a cloud-connected client application controller 160 is being used by the user. However, other characteristics of the cloud-connected client application controller 160, the user, the cloud-based client applications, and the like can be used for the purpose of matching users in a cloud-based client application competition or the like on the cloud-based client application platform 100, 200, or 300. Additionally or alternatively, suitable machine learning/artificial intelligence techniques can be used to match users. For example, a machine learning model can be trained based on data from all users in a cloud-based client application. The machine learning model can then be used to dynamically match users for a competition or tournament in the cloud-based client application. The machine learning model can be updated or otherwise adapted as the characteristics of users evolve over time (e.g., changing win/loss ratios and experience levels, preferences for certain matches or tournaments in the cloud-based client applications and not others, and the like).

In some implementations of the present invention, the cloud-based client application (executing in either an application engine module or an application instance module) can be paused during an active session. For example, the user can pause the cloud-based client application at any particular or desired position, point or time during the active session with the cloud-based client application (e.g., by pressing a suitable "pause" button displayed to the user in or with the browser application). Additionally or alternatively, the cloud-based client application can be paused if the connection between the browser module 150 and the server system 102 is interrupted or lost during the active session. Additionally or alternatively, the cloud-based client application can be paused if the user leaves the active session (e.g., by pressing a browser "back" button or closing the browser application). In some implementations of the present invention, one or more suitable cookies can be stored on the client device 148 (e.g., in or associated with the browser module 150), which the browser module 150 can check to determine if there are any active sessions for the user. Such information can be communicated to the session management controller 140 via the session information module 156. The user's interaction with the cloud-based client application can resume at the point paused once the connection has been reestablished or the user returns to the active session (e.g., by pressing a suitable "play" button displayed to the user in or with the browser application, pressing a "forward" button or re-opening the browser application). In an embodiment, the active session can be held open or otherwise maintained for a predetermined period of time (e.g., 1 hour, 2 hours, 1 day, etc.) while the active session is paused or if the user exits or disconnects from the active session. After the predetermined period of time has expired, the active session can be ended and the application engine module or the application instance module can be deregistered. If the user desires to continue the active session before expiration of the predetermined period of time, the user can, for example, press a "play" button, refresh the webpage in the browser application or select the same URL, link, or hyperlink used to initiate the original active session to rejoin the previously assigned and reserved application engine module or application instance module. In some implementations of the present invention, the active session can be held open or otherwise maintained indefinitely until the user exits or otherwise ends the active session.

By maintaining the reserved application engine module or the reserved application instance module and the state of the cloud-based client application during such a pause, some implementations of the present invention can allow users to begin an active session on one client device 148, pause the active session at a particular or desired position, point or time, and then continue the active session on one or more other (different) client devices 148 from the paused position, point or time. For purposes of illustration and not limitation, a user can request to initiate an active session on a first client device 148 (e.g., a smartphone). The user can then pause the active session (e.g., by closing the browser application on the first client device 148) at a particular or desired position, point or time. The state of the cloud-based client application can be saved in the state module of the application engine module or application instance module assigned and registered for that active session. The user can then switch to a second client device 148 (e.g., a desktop computer) and select the same URL, link, or hyperlink (through the display module 152 in the browser module 150 running on the second client device 148) that was used to initiate the original active session on the first client device 148. Such action can cause the active session to resume in the browser module 150 of the second client device 148. Thus, the user can be presented with the same digital page of the active session of the cloud-based client application paused at the same position, point or time from the first client device 148. The user can seamlessly continue to interact with the same cloud-based client application via the second client device 148 (e.g., by pressing an appropriate "play" button in the browser application) from the paused position, point or time in the same or similar manner as if the user had continued interacting with the cloud-based client application on the first client device 148. To support such platform switching, the session management controller 140 can maintain a user ID or other appropriate identifier that uniquely identifies the user in addition to the module ID. Using both the user ID and the module ID in combination with the cloud-based client application selection from the user (received from the second client device 148) and the saved state of the cloud-based client application, the session management controller 140 can identify the correct (paused) application engine module or application instance module to re-assign to the second client device 148 to allow the user to continue the active session on the second client device 148 from the same position, point or time paused on the first client device 148. In an alternative embodiment, if the user selects the same cloud-based client application from the same URL, link, or hyperlink on the second client device 148, the user can be presented with a choice of either continuing the same active session on the cloud-based client application from the same paused position, point or time or starting a new active session with the cloud-based client application.

In the event of an outage or crash of an application engine module or an application instance module during an active session, the session management controller 140 can reserve and allocate a new application engine module or a new application instance module (depending on which was being used for the active session at the time of the outage or crash) to the user. The cloud-based client application running in the application engine module or the application instance module can be populated with information from the previous (pre-outage/pre-crash) active session (e.g., using the cloud-based client application state and other session information retrieved from the databases 146) to mirror the state of the cloud-based client application at the time just before the outage or crash so that it appears to the user that the active session was simply paused. The user can then return to and reengage with the active session in the manner previously described.

In some implementations of the present invention, the session management controller 140 (e.g., via the session manager module 142) can operate in conjunction with the browser module 150 (e.g., via one or both of the display module 152 or the interaction capture module 154) to measure and monitor network latency information or other suitable characteristics of network communications between the client device 148 and server system 102 during an active session and to communicate such latency information to the session management controller 140 (e.g., via the session information module 156). The network latency information can be used to temporarily pause the active session if network latency is above a threshold that is predetermined or dynamic (e.g., based on network latency trends, usage trends, etc.) and then resume the active session once the network latency falls below the threshold. Additionally or alternatively, the network latency information can be used by the server system 102 (e.g., via the video/audio communication module 132) for network connection quality management. For example, the video/audio communication module 132 can use the network latency information to determine the network connection quality to the client device 148. If the network connection quality is below a threshold that is predetermined or dynamic (e.g., based on network latency trends, usage trends, etc.), the video/audio communication module 132 can modify the quality and/or characteristics of the video/audio media data that is being streamed to the client device 148. For example, if the network connection quality is below the threshold, the video/audio communication module 132 can lower the frame rate, lower the resolution, and the like of the streamed video/audio media data so as to maintain smooth display and interaction for the cloud-based client application on the client device 148 during the active session (e.g., to maintain smooth gameplay on the client device 148 in the context of cloud-based mobile games), so that the active session does not need to be paused or otherwise interrupted. The video/audio communication module 132 can update the quality and/or characteristics of the stream of video/audio media data periodically or continuously throughout the active session (e.g., lowering and/or raising the frame rate, resolution, etc. of the video/audio media data stream as the network connection quality fluctuates over the course of the active session). Consequently, the server system 102 can use the network latency information to determine, vary, and control the video/audio streaming quality to the client devices 148 to maintain a smooth display and interaction for the cloud-based client application for the user.

Additionally or alternatively, the network latency information can be used by the session management controller 140 to determine and select appropriate application engine modules or application instance modules for users. For example, in some implementations of the present invention, the server system 102 can include a plurality of application engine module controllers 104, with each application engine module controller 104 managing respective pluralities of application engine modules 106 to form one or more application engine module clusters, as illustrated and discussed with respect to FIGS. 1 and 2. In some implementations of the present invention, the server system 102 can include a plurality of module controllers 304, with each module controller 304 managing respective pluralities of application engine modules 206 to form one or more application engine module clusters and/or managing respective pluralities of application instance modules 310 to form one or more application instance module clusters, as illustrated and discussed with respect to FIG. 3. The application engine module clusters and/or application instance module clusters can be geographically distributed such that each of the respective pluralities of application engine modules 106 or 206 and/or respective pluralities of application instance modules 310 can be located in different geographical locations. When a user requests an active session with a cloud-based client application, the network latency information can be used by the session management controller 140 to cause an application engine module or application instance module to be reserved and assigned that is closest geographically or otherwise has the smallest network latency to the client device 148 of the user. By measuring and monitoring the network latency information for all client devices 148, the server system 102 can create a heat map or the like of the network latencies throughout the cloud-based client application platform 100, 200, or 300 that can be used to reserve and assign an optimal application engine module or an optimal application instance module (e.g., optimal from the standpoint of network latency or network connection quality) to each user so as to maintain smooth display and interaction for the cloud-based client application on the client devices 148 during the respective active sessions.

According to embodiments, because the cloud-based client applications can be run remotely in server system 102 and can be displayed on any suitable client device 148, the present invention can also allow cloud-based client applications to be integrated into third-party platforms, including third party websites and applications, by embedding or otherwise providing a URL or link or hyperlink to one or more cloud-based client applications into the third-party platform. Such integration can allow those third parties to more easily offer different features and functionality via the integrated cloud-based client application that complement and enhance the interaction and engagement with their third-party platforms. For purposes of illustration and not limitation, a retailer can incorporate any suitable cloud-based client application within their consumer touchpoints by embedding or otherwise providing a URL or other link or hyperlink to the cloud-based client application. For example, a retailer can incorporate a cloud-based mobile game into the retailer's website or application in accordance with embodiments of the present invention. A user can interact with the cloud-based mobile game in the retailer's website or application as if the cloud-based mobile game was executing on the user's client device, in the manner described herein. If the user wins the integrated cloud-based mobile game, the user can be awarded prizes in the retailer's own currency (e.g., loyalty rewards, coupons, discounts on products/services, free merchandise, etc.). The prize information can be communicated to the third-party platform from the integrated cloud-based mobile game (e.g., via the server system 102) and maintained in the retailer's website or application for use by the user. For example, a fast-food restaurant can integrate a cloud-based mobile game into their website or application in accordance with embodiments of the present invention. The user can select and engage with the integrated cloud-based mobile game via the website or application by, for example, selecting an appropriate embedded or otherwise provided URL or other link or hyperlink to the integrated cloud-based mobile game and then (remotely) interacting with the integrated cloud-based mobile game. If the user wins the integrated cloud-based mobile game, the user can be awarded a free side order of a food item (or other suitable prize or offering appropriate to the retailer) that can be redeemed at the fast-food restaurant. If the user loses, the user can be allowed to compete again, offered a lesser prize, offered another chance to play, etc. The present invention can support the integration of any suitable type of cloud-based client application into any appropriate third-party platform. By allowing users to interact with a cloud-based client application integrated into and through the third party's website or application in accordance with the present invention, the third party can increase user engagement metrics with their platform without requiring users to download and install the cloud-based client application to their client devices 148.

By integrating one or more cloud-based client applications into a third party's platform, distinct experiences can be tailored for users on the third-party platform that may not be available to the general population who access a non-integrated version of the cloud-based client application or access it from a different website or application. For example, the integrated cloud-based client application on the third-party platform can provide features, functionality, interface modifications, and the like that are available to users of the integrated cloud-based client application. For instance, if the integrated cloud-based client application is a cloud-based mobile game, users interacting with the integrated cloud-based mobile game can have access to special or promotional tournaments that are not available to general users of the cloud-based mobile game. Additionally or alternatively, users interacting with the integrated cloud-based client application can be presented with special limited time offers (LTOs), advertisements, or other promotions that are not available to general users of the cloud-based client application. Additionally or alternatively, users interacting with the integrated cloud-based client application can be presented with modified or enhanced user interfaces (e.g., different screens, customizations, third-party branding information, etc.) that are not available to general users of the cloud-based client application. Other modifications to the user experience of an integrated cloud-based client application (including modifications to the graphical user interface inside and/or outside of the integrated cloud-based client application) to support the third-party platform are possible.

In some implementations of the present invention, the data collected from users interacting with the integrated cloud-based client application can also be used to additionally or alternatively tailor the user experience of the integrated cloud-based client application. In an embodiment, the features, functionality, and capabilities of the integrated cloud-based client application on the third-party platform can be targeted to individual users based on the third-party platform user data, data from or associated with the user's client device 148, and the like. For example, the server system 102 can identify the geographical location of each user, such as via the GPS of the client device 148 (e.g., passed to the session management controller 140 via the session information module 156), from account profile information of the user (e.g., retrieved from the databases 146), or the like. A user who accesses the integrated cloud-based client application from one geographical location (e.g., a first state or region) can be presented with a user experience that is different from that of a user who accesses the integrated cloud-based client application from a different geographical location (e.g., a different state or region). The different user experience can include, for example, different user interfaces, different tournaments (e.g., in the context of cloud-based mobile games), different features and functionality, and the like. For instance, if the integrated cloud-based client application is a cloud-based mobile game, the user data can be used to match players for the integrated cloud-based mobile game. For example, for a competitive, skill-based integrated cloud-based mobile game, the user information can be used to match users with other users who are interacting with the integrated cloud-based mobile game rather than with users from the general population of the (non-integrated) cloud-based mobile game. Such player matching can assist in ensuring fairness in the competitions and/or to enforce anti-fraud/anti-cheat measures, as a user of the integrated cloud-based mobile game may have access to features and functionality that are not available to the general population of users of the (non-integrated) cloud-based mobile game.

Figure 4:
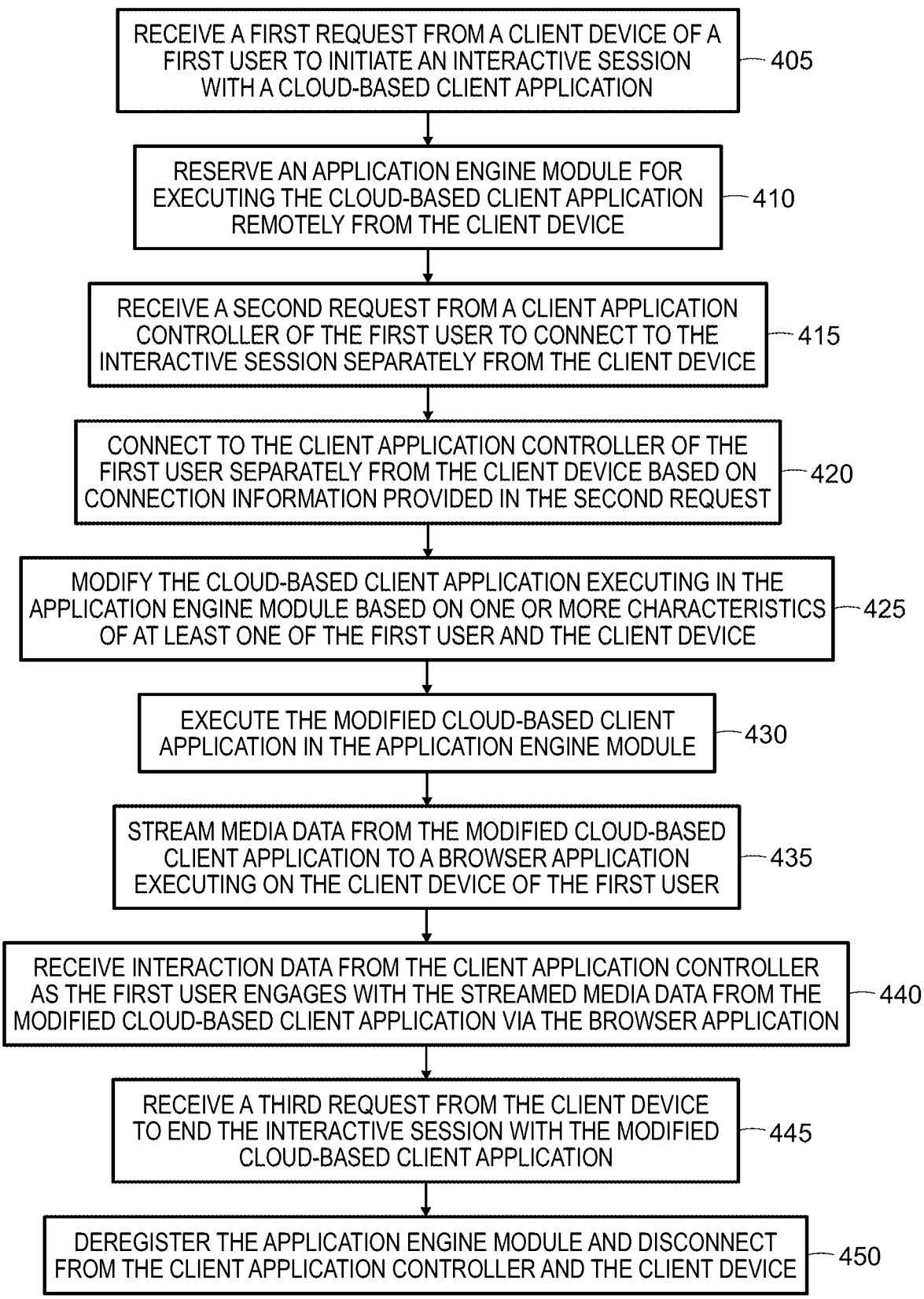
FIG. 4 is a flowchart of an example method for remotely controlling cloud-based client applications.

Some implementations of the present invention can be used to integrate cloud-based client applications into online or digital advertisements. For purposes of illustration and not limitation, a cloud-based mobile game can be integrated into a digital advertisement to create an interactive ad unit, such as a playable ad. In some implementations of the present invention, the integrated cloud-based mobile game can be accessed from the playable ad by having the user click on a URL, link, or hyperlink embedded or otherwise provided in the playable ad. Alternatively, the cloud-based mobile game can start automatically within the playable ad upon surfacing, presentation, or display of the playable ad to the user. A user can interact with the integrated cloud-based mobile game in and through the playable ad, for example, to win prizes, promotions, and other like rewards as part of the digital ad campaign. In an embodiment, such rewards could be used for the cloud-based mobile game itself (e.g., virtual currency or rewards) to incentivize users to interact with the playable ad. For example, users can use such rewards for making in-app purchases or for other types of redemptions or purchases within the integrated cloud-based mobile game itself while interacting with the playable ad. In an alternative embodiment, such rewards can be used for or with another application or website associated with the digital ad campaign to drive user engagement. However, any suitable cloud-based client application can be integrated into a digital advertisement to create an interactive ad unit. For example, an interactive ad unit or other digital advertisement for a cloud-based client application product can include a trial version (or even a fully-enabled, but time-limited version) of the cloud-based client application product integrated into the interactive ad unit or other digital ad. Consequently, users can engage with and evaluate the cloud-based client application product (e.g., within and through the interactive ad unit or other digital ad) without having to wait to download and install it or otherwise purchase it before evaluation. FIG. 4 is a block diagram illustrating an example method 400 for remotely controlling cloud-based client applications using, for example, the server system 102 and the cloud-connected client application controller 160, in accordance with embodiments of the disclosure. At block 405, the server system 102 can receive a first request from a client device (e.g., client device 148) of a first user to initiate an interactive session with a cloud-based client application. The first request can include one or more characteristics of at least one of the first user and the client device. The cloud-based client application can be configured to execute on a cloud-based computing platform (e.g., the server system 102) different from the client device. At block 410, the server system 102 can reserve, in response to the first request, an application engine module (e.g., from the plurality of application engine modules 106) for executing the cloud-based client application remotely from the client device. The application engine module can be bound to the first user for a duration of the interactive session. In an embodiment, each application engine module can be reserved for one user such that each application engine module can be used by at most a single (bound) user during an interactive session. At block 415, the server system 102 can receive a second request from a client application controller (e.g., cloud-connected client application controller 160) of the first user to connect (e.g., wirelessly via Wi-Fi or the like) to the server system 102 for the interactive session separately or otherwise independently from the client device (e.g., client device 148). At block 420, the server system 102 can connect to or otherwise initiate communication with the cloud-connected client application controller of the first user (e.g., cloud-connected client application controller 160) separately from the client device (e.g., client device 148) based on connection information (e.g., networking credentials or the like) provided to the server system 102 in the second request. At block 425, the server system 102 can modify the cloud-based client application executing in the application engine module based on the one or more characteristics of at least one of the first user and the client device. In some implementations of the present invention, the one or more characteristics of the first user and/or the client device can be used to alter the cloud-based client application that executes in the application engine module (e.g., for a logged-in state or the like). At block 430, the server system 102 can execute the modified cloud-based client application in the application engine module. At block 435, the server system 102 can stream media data from the modified cloud-based client application to a browser application or other suitable application (e.g., browser module 150) executing on the client device of the first user. At block 440, the server system 102 can receive interaction data from the client application controller (e.g., cloud-connected client application controller 160) as the first user engages with the streamed media data from the modified cloud-based client application via the browser application. At block 445, the server system 102 can receive a third request from the client device to end the interactive session with the modified cloud-based client application. In some implementations of the present invention, the third request can be a termination of the stream to which the client device is connected rather than a specific request from the client to end the interactive session. At block 450, the server system 102 can deregister or deallocate the application engine module in response to the second request and disconnect or otherwise cease communication with the client application controller (e.g., cloud-connected client application controller 160) and the client device (e.g., client device 148). In an embodiment, the application engine module can be deregistered or deallocated from inventory and the processor(s) and process(es) supporting the application engine module can be spun down or otherwise terminated so that the application engine module is not reused for multiple users. In an alternative embodiment, the application engine module can be unbound from the first user and available for use by a second (or subsequent) user.

Thus, in some implementations of the present invention, by connecting the cloud-connected client application controller to the cloud-based client application platform, rather than to the user's device, the cloud-connected client application controller can provide user input to the cloud-based client application platform to substantially reduce signal latency. Additionally, embodiments of the present invention can improve network efficiency by not requiring users to download and install to their client device numerous (e.g., dozens, hundreds, or more) different client applications with which they would like to interact. Instead, the present invention can improve network traffic and network bandwidth utilization, since it is the video/audio data and user input that are communicated between the server system 102 and the client device 148 and cloud-connected client application controller 160, respectfully, rather than the entire client application itself. Additionally, the present invention can reduce computer storage requirements, both on the client side and server side. For example, users would not be required to download and install any cloud-based client applications on and to their client device. In some implementations of the present invention, the server system 102 can store a single version of a cloud-based client application which can be accessed from and distributed to any type of client device, instead of having to store numerous different versions of the client application to support a plethora of client devices.

Embodiments of the present invention can also improve the processing efficiency of the client devices 148, since the client devices 148 can process the video/audio data from the cloud-based client application more quickly and more efficiently than executing the entire client application itself natively on the client device. Embodiments of the present invention can also improve the processing efficiency of the server system 102. The server system 102 can allocate computing resources when an application engine module and/or application instance module is registered for an active session and deallocate those resources when the active session is completed, rather than maintaining continuous execution of and computing resources to support the cloud-based client application on the server system 102. In other words, the server system 102 can register and deregister application engine modules and/or application instance modules, respectively, as needed without having to continually maintain and process each cloud-based client application for each client device. Consequently, the server system 102 can more effectively allocate computer processing resources to those application engine modules and/or application instance modules (and the cloud-based client applications running in those application engine modules or as application instances) that are being used and away from those application engine modules and/or application instance modules that are not. In some implementations of the present invention, the pre-warming of application engine modules in application engine module pools and/or application instances in application instance pools can also substantially reduce the response time for establishing active sessions. Consequently, embodiments of the present invention can manage users in active sessions at scale to maintain instant (or nearly instant) startup and interaction with the cloud-based client applications (e.g., "instant play" in the context of cloud-based mobile games), particularly when there are, for example, hundreds or thousands of cloud-based client applications and millions, tens of millions, or more users interacting with those cloud-based client applications concurrently.

Figure 5:
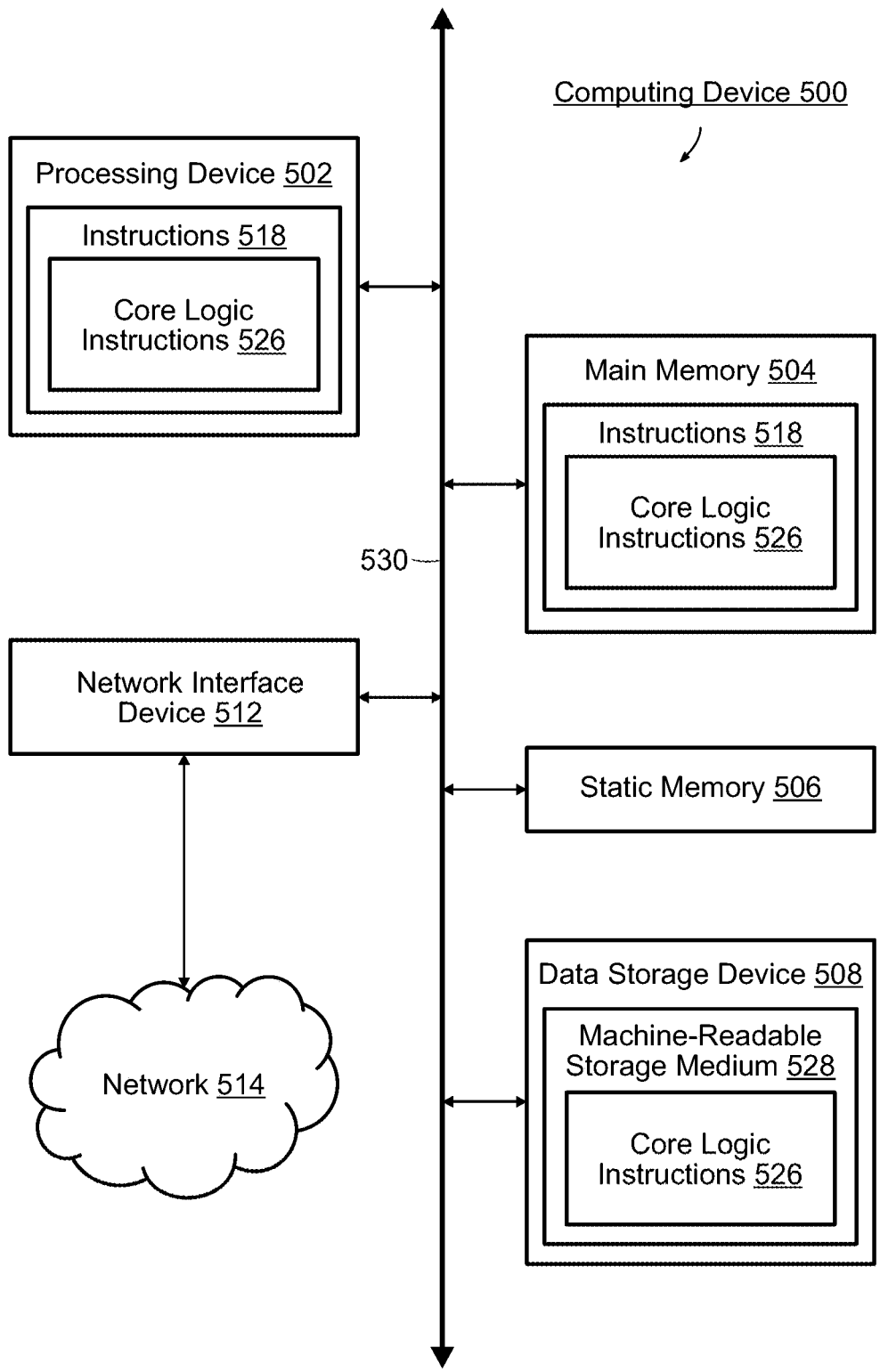
FIG. 5 is a block diagram of an example computing device that may perform one or more of the operations described herein, in accordance with the present embodiments.

FIG. 5 is a block diagram of an example computing device 500 that may perform one or more of the operations described herein, in accordance with the present embodiments. The computing device 500 may be connected to other computing devices in a LAN, an intranet, an extranet, and/or the Internet. The computing device 500 may operate in the capacity of a server machine in client-server network environment or in the capacity of a client in a peer-to-peer network environment. The computing device 500 may be provided by a personal computer (PC), a set-top box (STB), a server, a network router, switch or bridge, or any machine capable of executing a set of instructions (sequential or otherwise) that specify actions to be taken by that machine. Further, while only a single computing device 500 is illustrated, the term "computing device" shall also be taken to include any collection of computing devices that individually or jointly execute a set (or multiple sets) of instructions to perform the methods discussed herein.

The example computing device 500 may include a computer processing device 502 (e.g., a general purpose processor, ASIC, etc.), a main memory 504, a static memory 506 (e.g., flash memory or the like), and a data storage device 508, which may communicate with each other via a bus 530. The computer processing device 502 may be provided by one or more general-purpose processing devices such as a microprocessor, central processing unit, or the like. In an illustrative example, computer processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The computer processing device 502 may also comprise one or more special-purpose processing devices, such as an application specific integrated circuit (ASIC), a field programmable gate array (FPGA), a digital signal processor (DSP), network processor, or the like. The computer processing device 502 may be configured to execute the operations described herein, in accordance with one or more aspects of the present disclosure, for performing the operations and steps discussed herein.

The computing device 500 may further include a network interface device 512, which may communicate with a network 514. The data storage device 508 may include a machine-readable storage medium 528 on which may be stored one or more sets of instructions, e.g., instructions for carrying out the operations described herein, in accordance with one or more aspects of the present disclosure. Instructions 518 implementing core logic instructions 526 may also reside, completely or at least partially, within main memory 504 and/or within computer processing device 502 during execution thereof by the computing device 500, main memory 504 and computer processing device 502 also constituting computer-readable media. The instructions may further be transmitted or received over the network 514 via the network interface device 512.

While machine-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media, magnetic media, and the like.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, solid state drives, or the like. However, a computer need not have such devices. Moreover, a computer can be embedded in another device, e.g., a smart phone, a mobile audio or media user, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor, a light emitting diode (LED) monitor, or the like, for displaying information to the user and a keyboard and a pointing device, e.g., a mouse, a trackball, a touchpad, a stylus, or the like, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like. In addition, a computer can interact with a user by sending resources to and receiving resources from a device that is used by the user; for example, by sending web pages to a web browser on a user's client device in response to requests received from the web browser.

Embodiments of the subject matter described in this disclosure can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), peer-to-peer networks (e.g., ad hoc peer-to-peer networks), and the like.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Reference throughout this disclosure to "one embodiment" or "an embodiment" means that a particular feature, structure, or characteristic described in connection with the embodiments included in at least one embodiment. Thus, the appearances of the phrase "in one embodiment" or "in an embodiment" in various places throughout this disclosure are not necessarily all referring to the same embodiment. In addition, the term "or" is intended to mean an inclusive "or" rather than an exclusive "or."

While this disclosure contains many specific implementation details, these should not be construed as limitations on the scope of any inventions or of what may be claimed, but rather as descriptions of features specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations and/or logic flows are depicted in the drawings and/or described herein in a particular order, this should not be understood as requiring that such operations and/or logic flows be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The above description of illustrated implementations of the invention is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

What is claimed is:

1. A method, comprising:
receiving, by at least one data processor, a first request from a client device of a first user to initiate an interactive session with a cloud-based client application and a second request from a cloud-connected client application controller of the first user to connect to the interactive session, wherein the cloud-based client application is configured to execute on a computing platform different from the client device and the cloud-connected application controller, and wherein the cloud-connected application controller is separate from and in communication with the client device;
reserving, by the at least one data processor and in response to the first request, an application engine from a pre-instantiated application engine pool of a plurality of pre-instantiated application engine pools within which the cloud-based client application executes remotely from the client device and the cloud-connected application controller;
replacing the application engine with a second application engine;
connecting, by the at least one data processor and in response to the second request, to the cloud-connected client application controller separately from the client device;
receiving, by the at least one data processor, interaction data as the first user engages with first media data associated with the cloud-based client application via the cloud-connected client application controller as the first media data is displayed to the first user via a display application executing on the client device;
modifying, by the at least one data processor, the cloud-based client application executing within the application engine based on the received interaction data; and
providing, by the at least one data processor, second media data associated with the modified cloud-based client application to the first user via the display application executing on the client device for interaction via the cloud-connected application controller.

2. The method of claim 1, further comprising, prior to receiving the first request, maintaining the application engine in a standby or sleep mode.

3. The method of claim 1, wherein the pre-instantiated application engine pool has a fixed size.

4. The method of claim 1, wherein the pre-instantiated application engine pool has a dynamically changing size.

5. The method of claim 4, wherein the size changes based at least in part on usage trends or historical usage information.

6. The method of claim 5, wherein the size increases as usage trends increase for an application engine module of the pre-instantiated application engine pool and the size decreases as usage trends decrease for the application engine module.

7. The method of claim 5, wherein changing the size of the pre-instantiated application engine pool comprises: training a machine learning model based on usage trend data for an application engine module to modify the size of the pre-instantiated application engine pool.

8. The method of claim 1, wherein at least a first subset of pre-instantiated application engine pools of the plurality of pre-instantiated application engine pools comprise fixed-size pre-instantiated application engine pools and at least a second subset of pre-instantiated application engine pools of the plurality of pre-instantiated application engine pools comprise dynamically-sized pre-instantiated application engine pools.

9. The method of claim 8, wherein the first subset comprises pre-instantiated application engine pools that have lower usage than the pre-instantiated application engine pools of the second subset.

10. A system, comprising:
- at least one data processor; and
- memory storing instructions that, when executed by the at least one data processor, cause the at least one data processor to perform operations comprising:
  - receiving a first request from a client device of a first user to initiate an interactive session with a cloud-based client application and a second request from a cloud-connected client application controller of the first user to connect to the interactive session, wherein the cloud-based client application is configured to execute on a computing platform different from the client device and the cloud-connected application controller, and wherein the cloud-connected application controller is separate from and in communication with the client device;
  - reserving, in response to the first request, an application engine from a pre-instantiated application engine pool of a plurality of pre-instantiated application engine pools within which the cloud-based client application executes remotely from the client device and the cloud-connected application controller;
  - replacing the application engine with a second application engine;
  - connecting, in response to the second request, to the cloud-connected client application controller separately from the client device;
  - receiving interaction data as the first user engages with first media data associated with the cloud-based client application via the cloud-connected client application controller as the first media data is displayed to the first user via a display application executing on the client device;
  - modifying the cloud-based client application executing within the application engine based on the received interaction data; and
  - providing second media data associated with the modified cloud-based client application to the first user via the display application executing on the client device for interaction via the cloud-connected application controller.

11. The system of claim 10, further comprising, prior to receiving the first request, maintaining the application engine in a standby or sleep mode.

12. The system of claim 10, wherein the pre-instantiated application engine pool has a fixed size.

13. The system of claim 10, wherein the pre-instantiated application engine pool has a dynamically changing size.

14. The system of claim 13, wherein the size changes based at least in part on usage trends or historical usage information.

15. The system of claim 14, wherein the size increases as usage trends increase for an application engine module of the pre-instantiated application engine pool and the size decreases as usage trends decrease for the application engine module.

16. The system of claim 14, wherein changing the size of the pre-instantiated application engine pool comprises: training a machine learning model based on usage trend data for an application engine module to modify the size of the pre-instantiated application engine pool.

17. The system of claim 10, wherein at least a first subset of pre-instantiated application engine pools of the plurality of pre-instantiated application engine pools comprise fixed-size pre-instantiated application engine pools and at least a second subset of pre-instantiated application engine pools of the plurality of pre-instantiated application engine pools comprise dynamically-sized pre-instantiated application engine pools.

18. The system of claim 17, wherein the first subset comprises pre-instantiated application engine pools that have lower usage than the pre-instantiated application engine pools of the second subset.

19. A computer program product comprising a non-transitory machine readable medium storing instructions that, when executed by at least one programmable processor forming part of at least one computing system, cause the at least one programmable processor to perform operations comprising:
- receiving a first request from a client device of a first user to initiate an interactive session with a cloud-based client application and a second request from a cloud-connected client application controller of the first user to connect to the interactive session, wherein the cloud-based client application is configured to execute on a computing platform different from the client device and the cloud-connected application controller, and wherein the cloud-connected application controller is separate from and in communication with the client device;
- reserving, in response to the first request, an application engine from a pre-instantiated application engine pool of a plurality of pre-instantiated application engine pools within which the cloud-based client application executes remotely from the client device and the cloud-connected application controller;
- replacing the application engine with a second application engine;
- connecting, in response to the second request, to the cloud-connected client application controller separately from the client device;
- receiving interaction data as the first user engages with first media data associated with the cloud-based client application via the cloud-connected client application controller as the first media data is displayed to the first user via a display application executing on the client device;
- modifying the cloud-based client application executing within the application engine based on the received interaction data; and
- providing second media data associated with the modified cloud-based client application to the first user via the display application executing on the client device for interaction via the cloud-connected application controller.

* * * * *